United States Patent
Brewer et al.

(10) Patent No.: US 11,204,949 B1
(45) Date of Patent: Dec. 21, 2021

(54) SYSTEMS, DEVICES, AND METHODS FOR CONTENT SELECTION

(71) Applicant: Snap Inc., Santa Monica, CA (US)

(72) Inventors: Jason Brewer, Marina del Rey, CA (US); Rodrigo B. Farnham, Los Angeles, CA (US); Nima Khajehnouri, Los Angeles, CA (US); David B. Lue, Santa Monica, CA (US); Zhuo Xu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 167 days.

(21) Appl. No.: 16/049,318

(22) Filed: Jul. 30, 2018

Related U.S. Application Data

(60) Provisional application No. 62/539,392, filed on Jul. 31, 2017.

(51) Int. Cl.
| | | |
|---|---|---|
| *G06F 16/31* | (2019.01) | |
| *G06Q 50/00* | (2012.01) | |
| *G06F 17/18* | (2006.01) | |
| *G06F 16/335* | (2019.01) | |

(52) U.S. Cl.
CPC .......... *G06F 16/313* (2019.01); *G06F 16/335* (2019.01); *G06F 17/18* (2013.01); *G06Q 50/01* (2013.01)

(58) Field of Classification Search
CPC ...... G06F 16/313; G06F 16/335; G06F 17/18; G06Q 50/01; G06Q 30/0255; G06Q 30/0251; G06Q 30/0275; G06Q 30/0273; G06Q 30/0241; G06Q 30/02; G06N 20/00; H04L 67/22
See application file for complete search history.

(56) References Cited

U.S. PATENT DOCUMENTS

| | | | |
|---|---|---|---|
| 10,581,953 B1* | 3/2020 | Brewer | H04L 67/306 |
| 2011/0184806 A1* | 7/2011 | Chen | G06Q 30/02 |
| | | | 705/14.52 |
| 2012/0130813 A1* | 5/2012 | Hicken | G06Q 30/0261 |
| | | | 705/14.54 |
| 2012/0158491 A1* | 6/2012 | Goulden | G06Q 30/0247 |
| | | | 705/14.46 |
| 2012/0272265 A1* | 10/2012 | Flatt | H04N 21/25841 |
| | | | 725/34 |
| 2013/0290116 A1* | 10/2013 | Hepworth | G06F 3/0482 |
| | | | 705/14.73 |
| 2014/0074824 A1* | 3/2014 | Rad | G06Q 10/10 |
| | | | 707/722 |

(Continued)

*Primary Examiner* — Jesse P Frumkin
(74) *Attorney, Agent, or Firm* — Schwegman Lundberg & Woessner, P.A.

(57) ABSTRACT

Disclosed are systems, methods, and computer-readable storage media to present content on an electronic display. In one aspect, a method includes identifying a first candidate content and a second candidate content for presentation on an electronic display, determining a first probability and a second probability that the first candidate content and the second candidate content respectively will elicit a particular type of input response, determining a first weight and a second weight based on the first probability and the second probability respectively, selecting either the first content or the second content based on the first weight and the second weight; and presenting the selected content on the electronic display.

20 Claims, 23 Drawing Sheets

(56) References Cited

U.S. PATENT DOCUMENTS

| | | | |
|---|---|---|---|
| 2014/0223329 A1* | 8/2014 | Falaki | G06F 13/00 |
| | | | 715/747 |
| 2014/0278973 A1* | 9/2014 | Lowe | G06Q 30/0205 |
| | | | 705/14.53 |
| 2014/0282281 A1* | 9/2014 | Ram | G06F 16/783 |
| | | | 715/863 |
| 2015/0277755 A1* | 10/2015 | Hoffman | G06F 3/04886 |
| | | | 705/12 |
| 2016/0283978 A1* | 9/2016 | Rabbat | G06F 3/0481 |
| 2017/0032450 A1* | 2/2017 | Jia | G06Q 50/01 |
| 2018/0067641 A1* | 3/2018 | Lerner | H04N 21/4312 |
| 2018/0204250 A1* | 7/2018 | Watine | G06Q 30/0275 |
| 2019/0244267 A1* | 8/2019 | Rattner | G06N 20/00 |
| 2020/0013079 A1* | 1/2020 | Herman | G06Q 10/067 |
| 2020/0175543 A1* | 6/2020 | Wigder | G06Q 30/0255 |

* cited by examiner

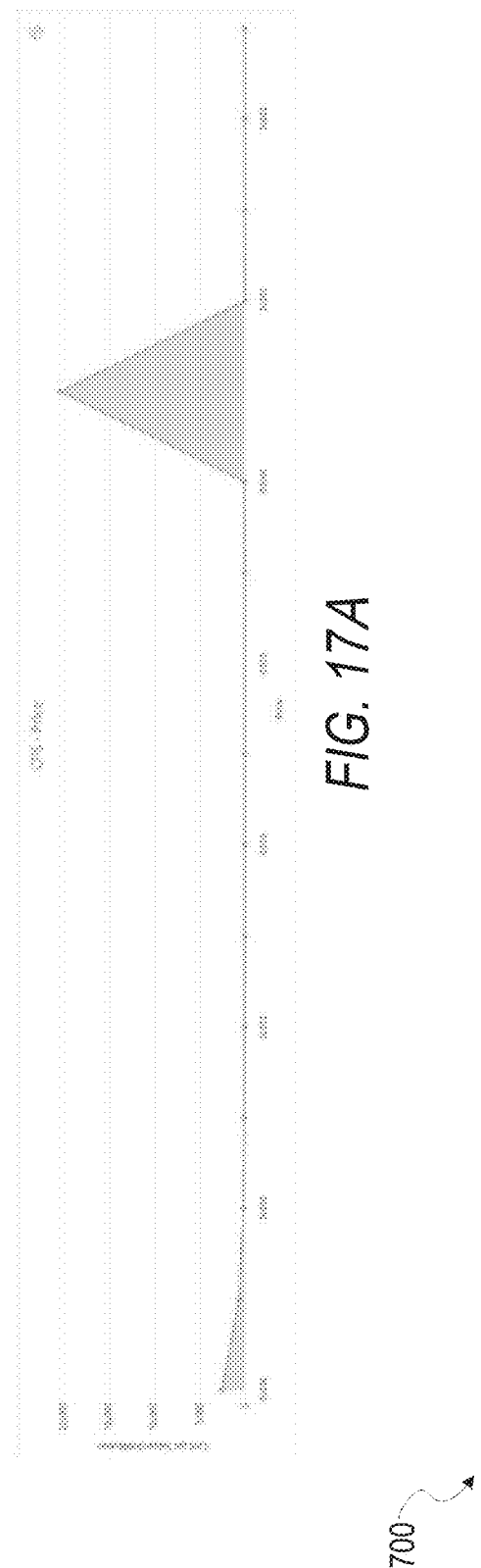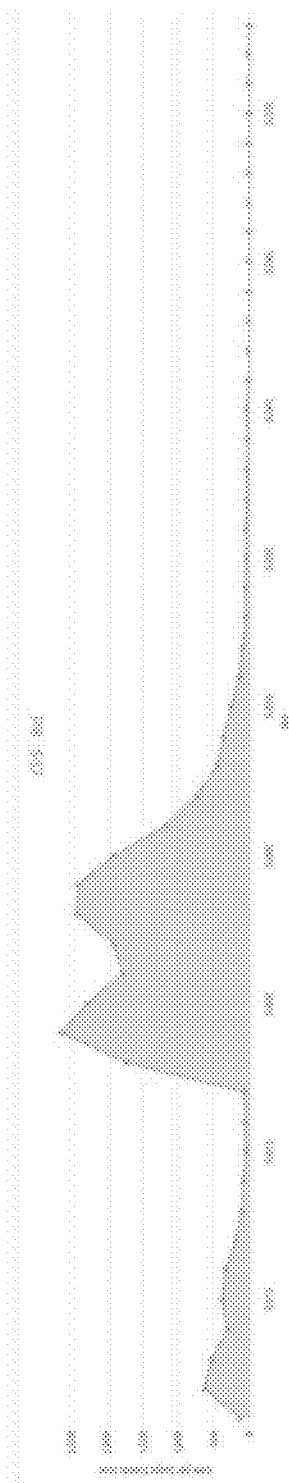
FIG. 17A
FIG. 17B

SYSTEMS, DEVICES, AND METHODS FOR CONTENT SELECTION

CROSS REFERENCE TO RELATED APPLICATIONS

This application claims priority to U.S. Provisional Application No. 62/539,392, filed Jul. 31, 2017 and entitled "SYSTEMS, DEVICES<AND METHODS FOR CONTENT SELECTION." The disclosure of this prior application is considered part of this application, and is hereby incorporated by reference in its entirety.

TECHNICAL FIELD

The present disclosure generally relates to the technical field of managing the display of content to users of a social network. Specifically, disclosed are methods for presenting content based on how a user may respond to the content.

BACKGROUND

Social networking is becoming essential to many as a form of communication. Social networking applications enable a user to view content provided by other users. Users may also be able to view other content, for example, content providing information such as news, historical information, or other types of information. Some information provided to a social network user may be more relevant and/or interesting to that user. Thus, the user may respond differently to the information, depending on to what extent the user has interest in the information. Therefore, methods and systems to provide the most valuable information to a user of a social network are desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 17A-B contrasts bid and actual prices for presentation of content.

DETAILED DESCRIPTION

Figure 1:
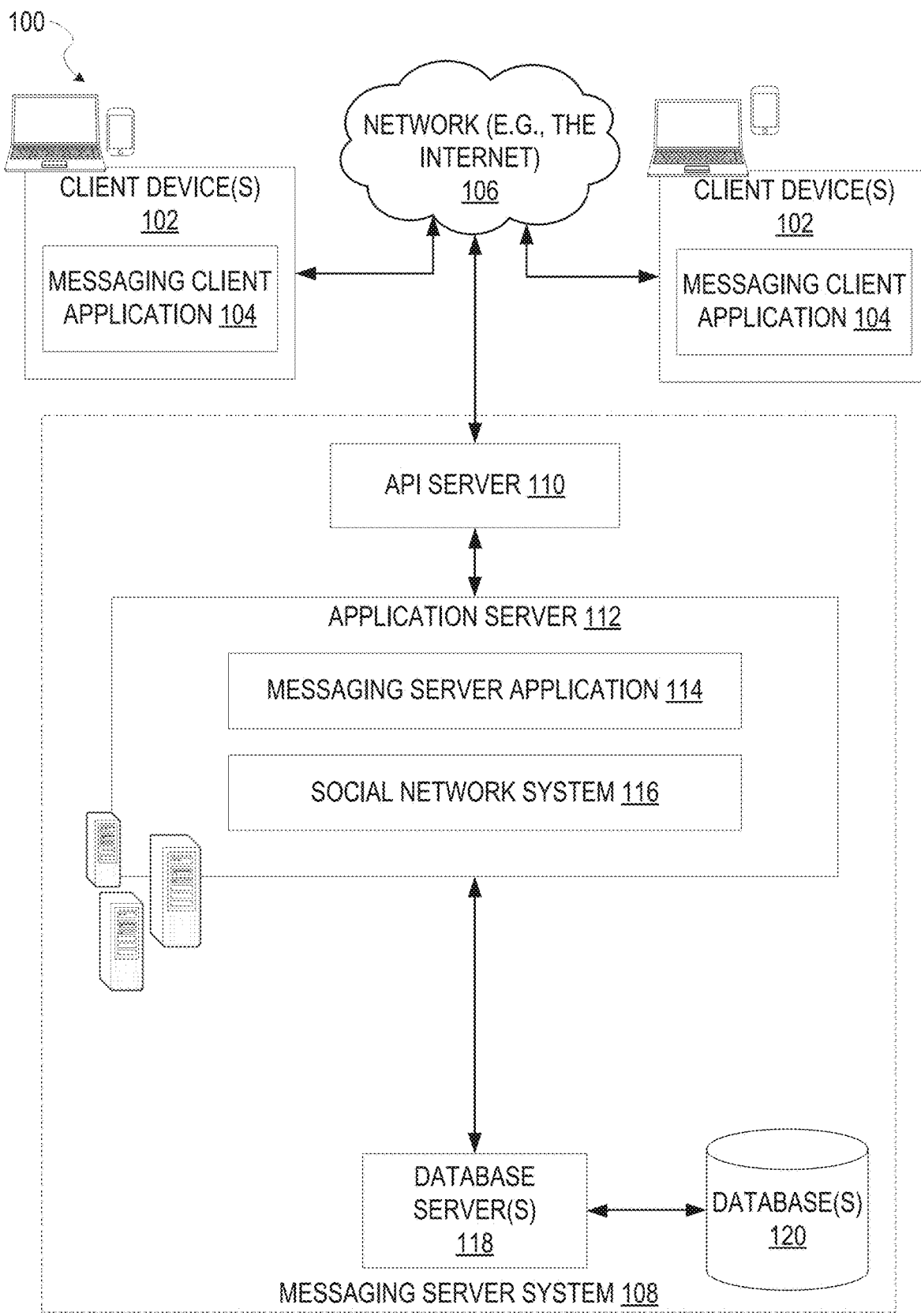
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that provide for the selection of content for display. The selection of content may be based on a probability of a particular type of response to the content. In some aspects, the probability of a response is based on a historical record of responses. For example, if a first type of response to particular content was historically provided a certain percentage of the time (such as a swipe down or skip operation), than an estimate for the first type of response to be provided in response to a new presentation of the particular content may be estimated at the certain percentage.

The disclosed methods and systems may provide for the display of a plurality of different content. Several types of input may be provided by the user in response to the content. One type of input may be a request by the user to complete interaction with a first displayed content, and to view other content. For example, in some aspects, a "swipe down" input after the first content is displayed may indicate a user request to view other content. Another type of input may indicate a request to view second content. The first content may prompt the user to view the second content in some aspects. For example, in some aspects, a "swipe up" input may indicate a user request to view the prompted second content.

The disclosed methods and systems may record how a user responds to content. For example, statistics may be maintained indicating for example, how many times a particular content is presented, how many times the user's response requested prompted content, and how many times the user's response requested other content. From this information, when content is presented, it may be possible to predict how the user will respond. For example, if a user historically requests prompted content 5% of the time, it is likely that when the content is presented, a probability that the user requests the prompted content is 5%.

The disclosed methods and systems may then determine whether to present a first or a second content based in part on the probability of a desired or prompted response to each of the content. In some aspects, content with a higher probability of a requested response may be favored over content with a lower probability. However, other embodiments may select the lower probability content for a variety of reasons discussed in more detail below.

Some aspects may utilize the methods, systems, and devices to provide for improved estimation of a value of a content presentation to an entity funding the presentation. For example, an advertiser on a social networking site may be charged a fee for each presentation of their content. The advertisement may provide a way for a viewer to learn more about an advertised product or service by entering a particular input, such as clicking on a link or swiping over the advertisement in a certain manner. Other responses may dismiss the advertisement and move the viewer on to other content. For example, in some aspects, an escape key or "swipe down" gesture may signal a request by the viewer to dismiss the advertisement and move on to other content. Regardless of whether a presentation results in a positive response by a viewer of the advertisement, the advertisement may be charged the same fee. Thus, the advertiser may bear the financial risk of advertising.

Different advertisements may have different likelihoods of positive responses. For example, a first advertisement by a first advertiser may elicit a positive response ten (10) percent of the time while a second advertisement by a second advertiser may elicit a positive response 70% percent of the time. If these two advertisers compete directly for advertising space on a social network, the first advertiser may be provided with more value than the second advertiser, due to the first advertiser's higher response rate. The disclosed methods and systems may enable the first and second advertisers to improve their estimates for the value provided by presentation of a particular advertisement. For example, advertisements with a higher positive response rate may in general, be more valuable that advertisements with a relatively lower positive response rate.

Knowledge of an advertisement's response probability may enable the advertiser to set a bid amount for presentation of the advertisement that is better aligned with their return on investment. For example, when two advertisers compete for presentation of their respective advertisements via an electronic bidding process, an advertiser with a higher predict return on their investment may be able to bid a higher amount than an advertiser with a relatively lower return.

Furthermore, different types of advertisers may place different values on advertising responses. For example, brand advertisers seek to get their message to as many people as possible. This may generate "buzz" and/or promote brand awareness. Goals of these types of advertisers may be centered around impressions and reach, and may place less emphasis on particular responses by readers of their advertisements than other advertisers, such as direct response advertisers.

Direct response advertisers have a specific goal in mind. For example, the direct response advertisers seek to induce particular actions by users when those users are presented with an advertisement. Example goals include inducing the user to request additional information, for example by watching a long form video. Alternatively, these advertisers may hope to induce the user to install an application, or make an electronic purchase in response to the advertisement.

In some aspects, the disclosed methods and systems shifts some risk associated with funding of presentation of content to a provider of a messaging system. In implementations that do not utilize the disclosed systems and methods, another entity, such as an advertiser, pay for presentation of particular content, and the advertiser assumes risk associated with a positive result of the presentation. In these implementations, the advertiser pays for the presentation of content, regardless of any positive result. In the methods and systems disclosed herein, some of that risk is mitigated by the provider of the messaging system. The provider of the messaging system may determine a probability of a positive result for the advertiser. By providing this information, the provider of the messaging system takes a risk that a value of presentation of particular content may be reduced when compared to systems that do not provide this probability information. In some aspects, since the provider of the messaging system is assuming at least a portion of the risk, the provider may be able to more effectively mitigate the risk when compared to the advertiser, due to the providers position and visibility to the messaging system as a whole.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
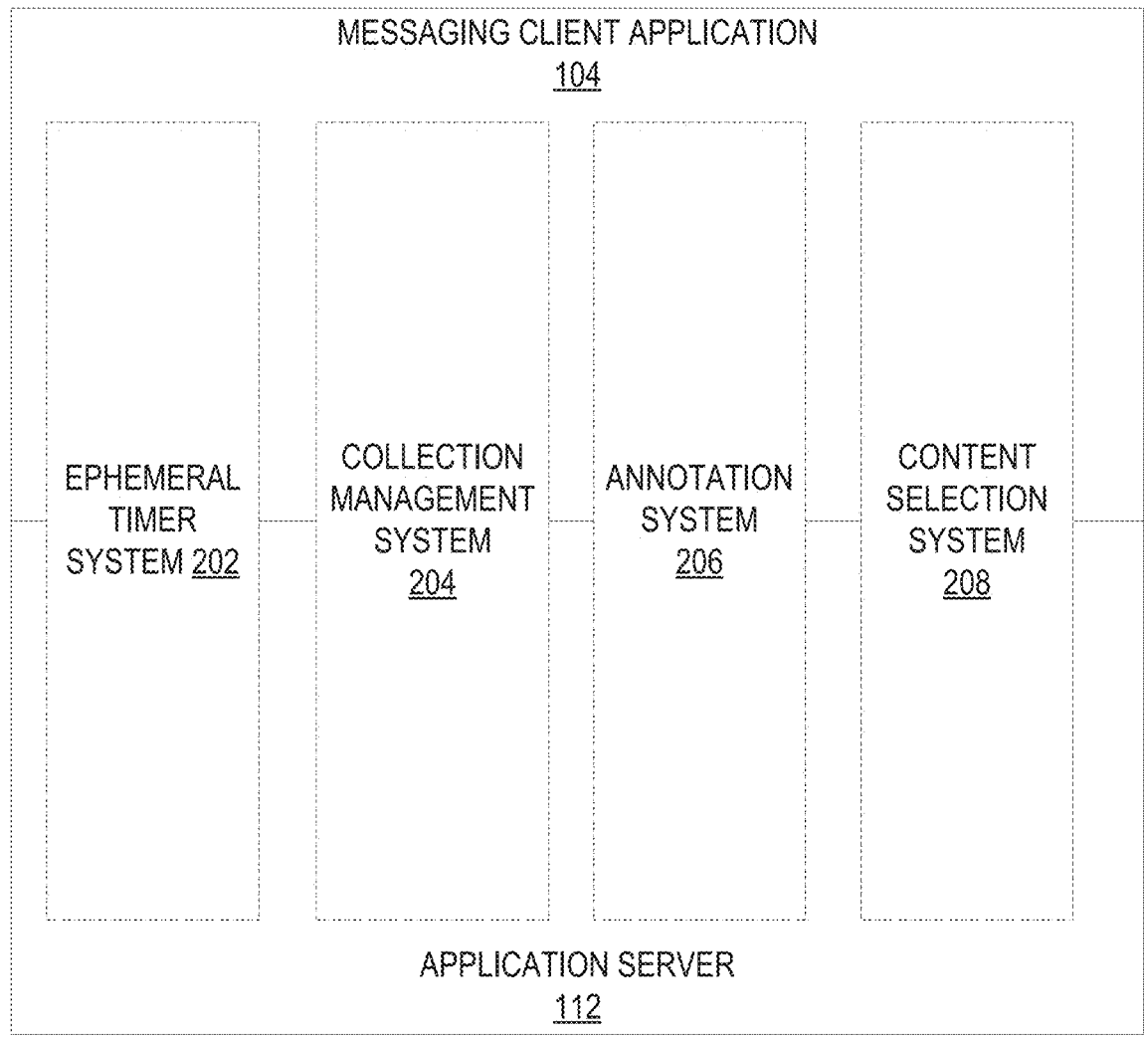
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a content selection system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The content selection system 208 may provide for selective presentation of content. In some aspects, the content selection system 208 may determine probabilities of particular responses to presented content based on a number of factors. These predictions may be based on prior results when the same content was presented under the same, similar, or even different conditions. The conditions under which the content is presented, and that may be considered when predicting a response may include time of day, season, month, demographics of the user being presented with the content, behavior of the user being presented with the content, such as average view time, content consumption rate, along with other factors. This information regarding previous presentations of the content and the relevant conditions, along with resulting user responses may be provided to a predictive model. Later, the model may be queried to determine a likely response to another presentation of the content under a particular set of conditions. This information may then be utilized to determine a weight associated with the presentation of the content. Weights of at least two different content may be compared to determine which content is presented.

Figure 3:
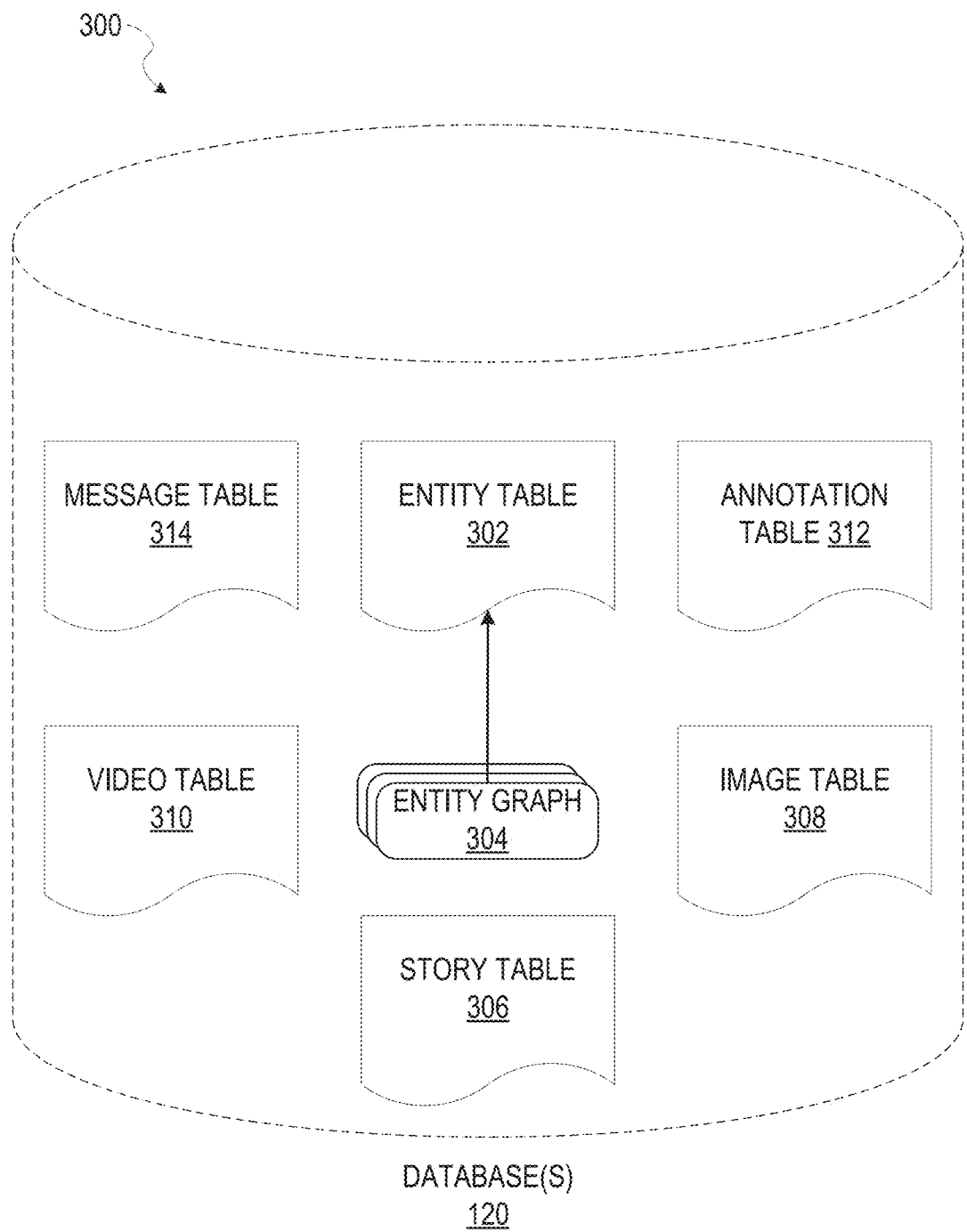
FIG. 3 is an exemplary data base schema utilized by the messaging system of FIG. 1.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
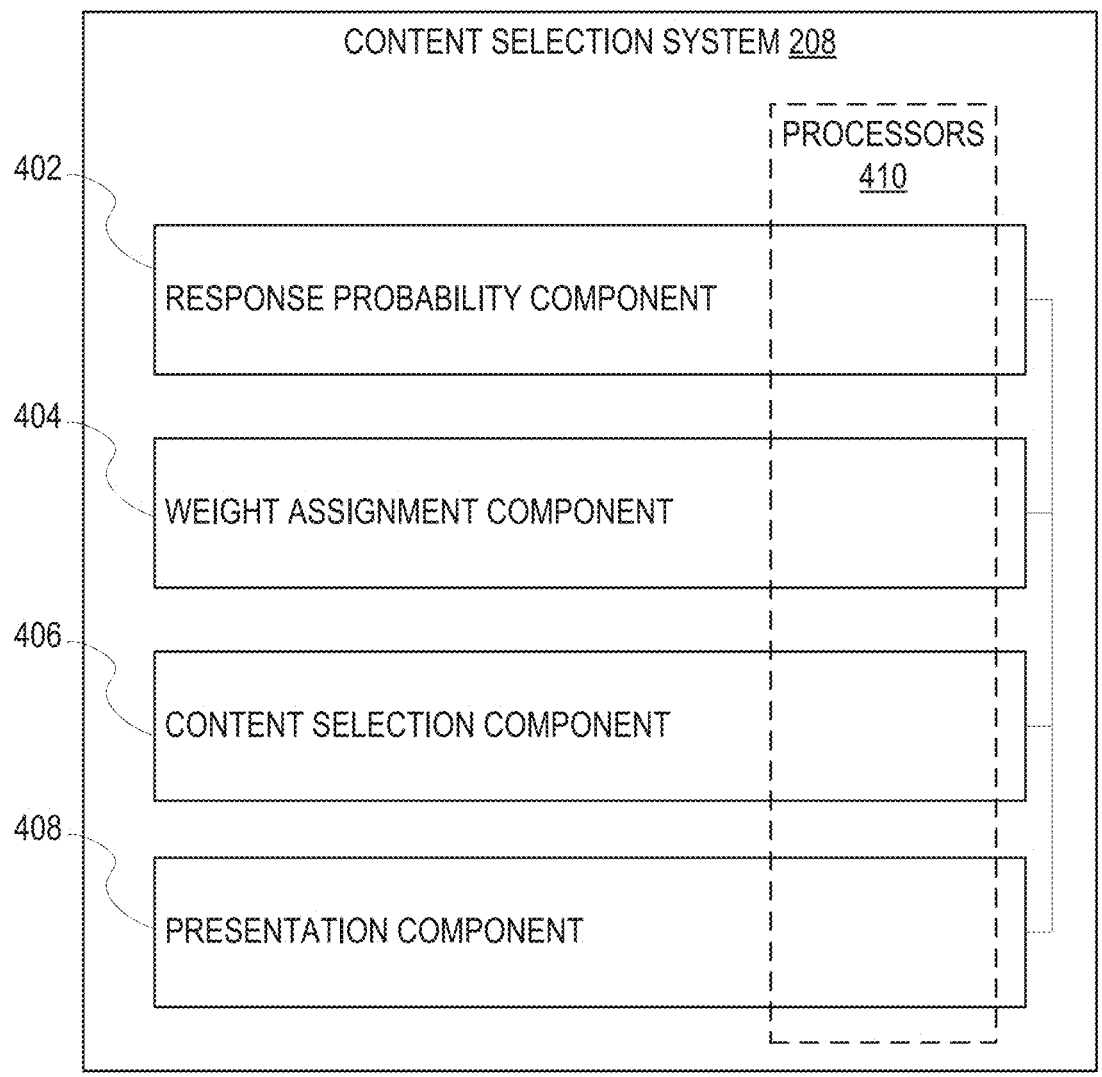
FIG. 4 is an exemplary block diagram illustrating functional components of a content selection system that forms part of the messaging system, according to some example embodiments.

FIG. 4 is a block diagram illustrating functional components of the content selection system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the content selection system 208 to facilitate additional functionality that is not specifically described herein. As shown, the content selection system 208 includes a response probability component, a weight assignment component 404, a content selection component 406, and a presentation component 408.

The response probability component 402 may determine a probability that a user will respond to particular content with a particular type of input. In some aspects, the response probability component 402 may aggregate prior responses to the content and calculate the probability based on the aggregated responses. In some aspects, the response probability component 402 may employ a model to predict probabilities of particular responses to presented content. In some aspects, the model may utilize machine learning techniques to generate the predictions. In some aspects, the machine learning may determine swipe rates and/or skip rates for particular content, as well as, in some aspects, time spent viewing the particular content. The machine learning may also determine a real time skip/swipe rate. The real time skip/swipe rate may be generated for a plurality of channels and/or a plurality of user demographics. The model may also consider a time of day the content will be presented. This may be correlated with historical results from similar times of day by the model.

In some aspects, the model may weigh a plurality of input parameters differently when generating a probability value for a response to particular content. In some aspects, these parameters may be categorized broadly into three types. A first type of parameter relates to the presented content itself. A second type of parameter relates to a user being presented with the content. A third type of input parameters relates to a channel requesting the content. Channels may include, for example, user stories, local campus, or discovery. In some aspects, a channel requesting the content may indicate a location of the content. A fourth type of parameter relates to temporal aspects of the presented content. For example, a time of day the content is to be presented may be considered.

Some aspects may determine a probability value based on a particular combination of input parameters to the model. For example, in some aspects, the probability value may be based on a combination of input parameters relating to the content itself, the user to which the content will be presented, the channel requesting the content, and/or temporal aspects of the presentation of the content.

Examples of content specific parameters include a life time distribution channel swipe rate, distribution channel swipe rate, life time distribution channel skip rate, a total number of swipes, distribution channel skip rate, a life time number of swipes, a lifetime number of skips. In some aspects, content specific parameters may relate to inventory pools, such as publisher stories, our stories, and my stories. For example, the content specific parameter may indicate a source of the content.

Examples of user specific parameters include swipe rate per month for the user, swipe count per month for the user, time viewed by the user, user's skip rate per month, user's skip count per month, and the user's time viewing each content presented.

Examples of parameters specific to channels include the type of channel on which the content will be presented, and the time of day of the request.

The weight assignment component 404 may assign weights to content. In some aspects, the weights may be assigned based on a probability assigned to the content by the response probability component 402. In some aspects, the weights may be proportional to the probability. In other aspects, the weights may be assigned based on other factors discussed in more detail below.

The content selection component 406 may select content for presentation from a plurality of candidate contents based in part, by weights assigned to the content by the weight assignment component 404.

The presentation component 408 may present media on an electronic display of a client device 102. In some aspects, the presented media is an image file. In other aspects, the presented media may be a video file. In some aspects, the presented media may be an installation dialog, such as a dialog enabling a user to install additional software on the client device. In some aspects, the presented media may be a web dialog.

The above referenced functional components of the content selection system 208 are configured to communicate with each other (e.g., via a bus, shared memory, a switch, or APIs). Collectively, these components facilitate selective presentation of content to users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the content selection system 208 may physically include an arrangement of one or more processors 410 (e.g., a subset of or among one or more processors of a machine) configured to perform the operations described herein for that component. As another example, any component of the content selection system may include software, hardware, or both, that configure an arrangement of the one or more processors 410 to perform the operations described herein for that component. Accordingly, different components of the content selection system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5A:
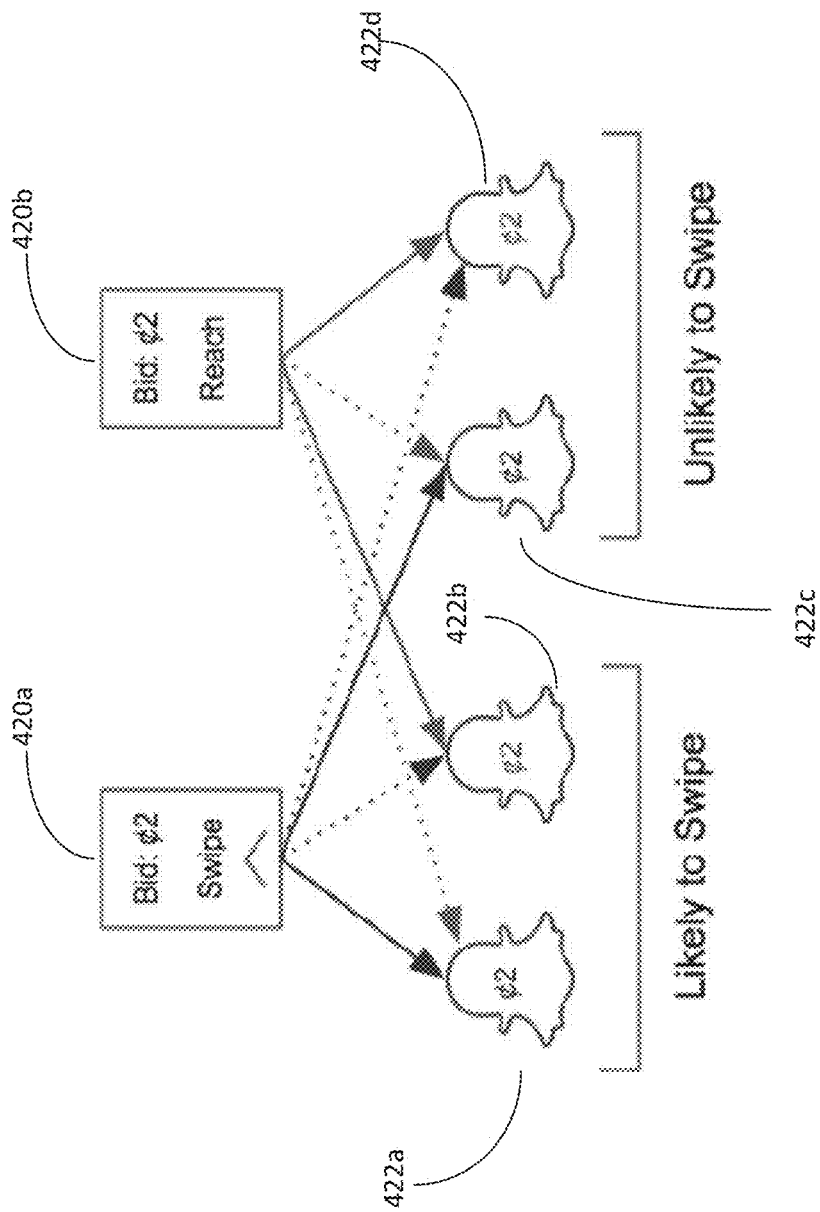
FIG. 5A is an illustration of competitive bidding for presentation of content.

FIG. 5A is an illustration of competitive bidding for presentation of content during two presentation opportunities 421a-b. Prior to introduction of the disclosed methods and systems, brand advertisers and direct advertisers competed directly. Thus, an impressions quality played no role in a price determined by the advertiser. Thus, a direct response advertiser had no power to discriminate between good impressions (those with a high percentage of desired results) and bad impressions (those with a relatively lower percentage of desired results). Thus, if a direct response advertiser assessed a value of $1 for a desired response to an advertisement, and an average positive response rate to an advertisement is two (2) percent, the advertiser cannot pay more than $0.02 per impression.

FIG. 5A shows two entities 420a-b bidding for presentation of content during four opportunities 422a-d. Each of entities 420a-b bids for content presented during each of opportunities 422a-d. Because entity 420a has knowledge only that in general, a positive response rate is 2%, the entity 420a is only able to bid a maximum of $0.02 per opportunity, even though opportunities 422a-b have a higher probability of a positive result (e.g. swipe) than opportunities 422c-d. Entity 420a is unaware of this difference in probabilities between opportunities 422a-b and opportunities 422c-d, and thus is unable to modify its bid accordingly. Entity 420b is similarly positioned, but bids $0.02 for different reasons than entity 420a. Entity 420b may bid $0.02 not due to an expected response rate for the opportunities 422a-d, but instead based on a value of impressions made during the opportunities 422a-d to the entity 420b.

Figure 5B:
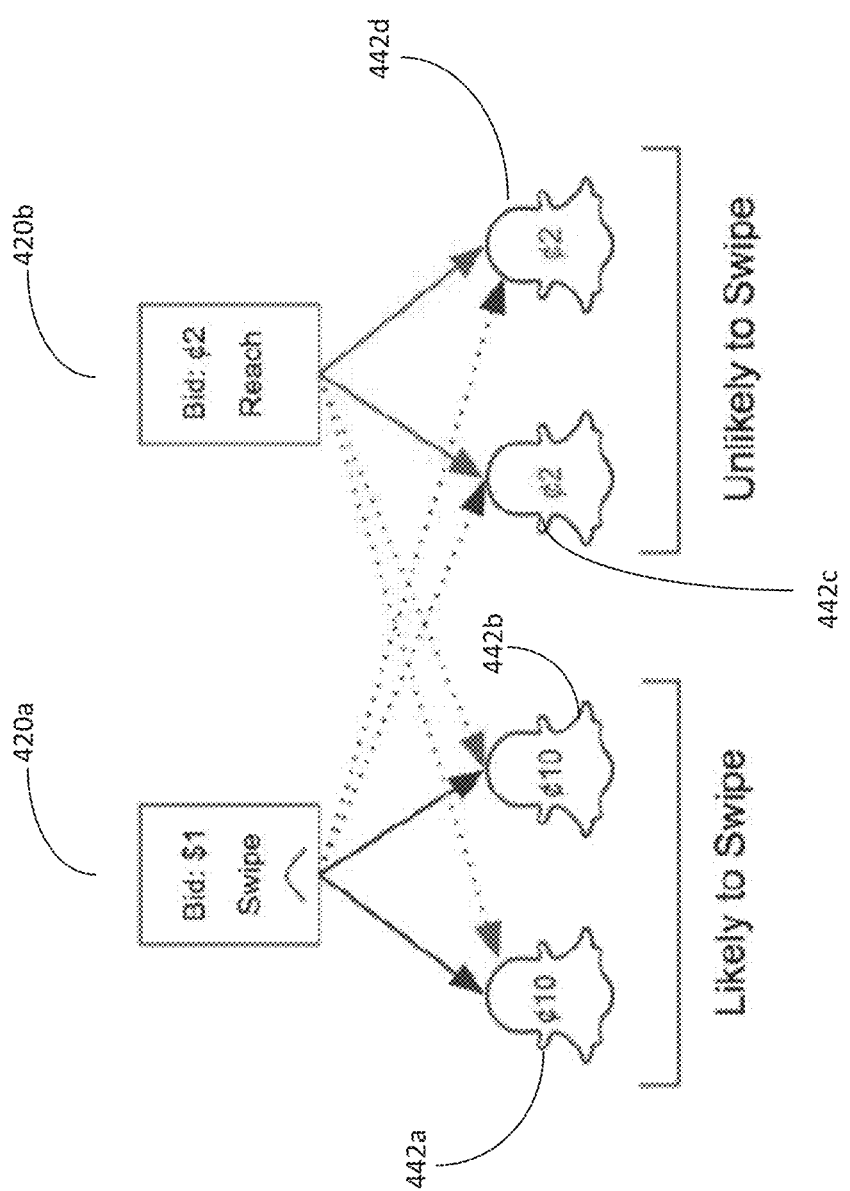
FIG. 5B is an illustration of competitive bidding for presentation of content.

FIG. 5B shows an alternative embodiment relative to the embodiment of FIG. 5A. In the embodiment of FIG. 5B, the two entities 420a-b may each be provided with information relating to the probability that a particular result may occur within the opportunities 442a-d. As such, one or more of the entities may change their maximum bid in response to the differing probabilities. For example, FIG. 5B shows that entity 420a, which may be a direct response advertiser, may bid a higher amount for a presentation during opportunity 442a-b, as a higher probability of a positive event (swipe) is associated with these opportunities when compared to opportunities 442c-d. Entity 420b may not change its bid across opportunities 442a-d, as entity 420b may be less sensitive to user responses to its presentations of content.

Figure 5C:
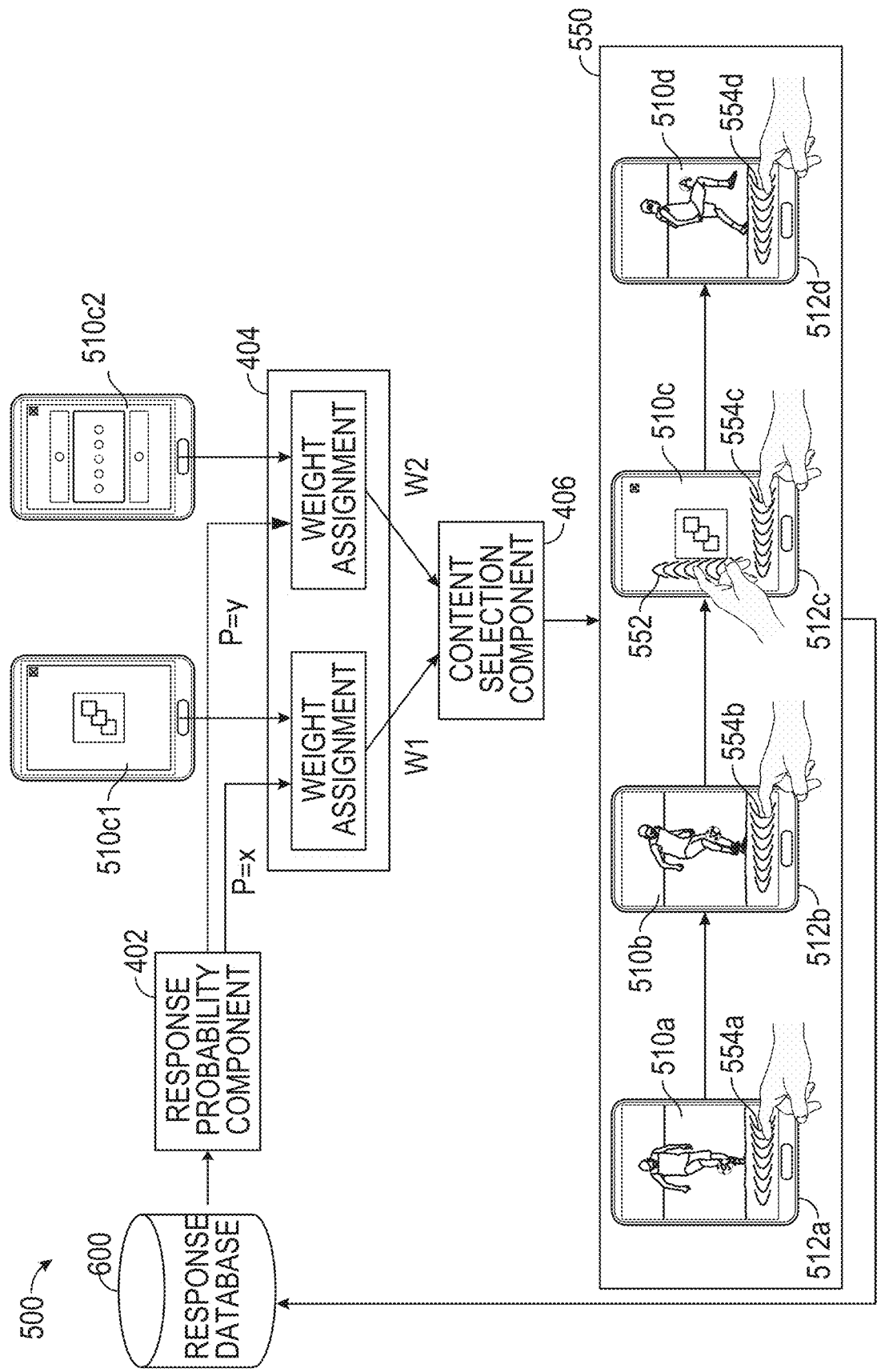
FIG. 5C is a data flow diagram for an exemplary embodiment.

FIG. 5C is a data flow diagram for an exemplary embodiment. The data flow 500 shown in FIG. 5C includes a sequence of content 550. The content sequence 550 may be displayed on an electronic display, such as an electronic display of a client device 102, discussed above with respect to FIG. 1. The content sequence 550 includes content 510a-d displayed in user interfaces 512a-d respectively. Each of the user interfaces 512a-d may accept at least two types of content. A first type of input 554a-d is shown for each of the user interfaces 512a-d respectively. The first type of input 554a-d may indicate a request to advance the sequence 550 (e.g. a swipe). The content 510a-b and 510d may be obtained from an event gallery or story in some aspects.

The messaging system 100 may determine to insert additional content into the sequence of content 510a-b and 510d. The messaging system 100 may select between a plurality of candidate content before determining which particular content to insert after content 510b. For example, the messaging system 100 may select between at least candidate content 510c1 and 510c2.

In some aspects, the response probability component 402, described above with respect to FIG. 4, may determine a probability of response of a certain type for each of the content 510c1 and content 510c2. For example, the candidate content 510c1 and content 510c2 may be presented in a user interface than can accept at least two types of input. As described above, the first type of input may indicate a request to advance the sequence of content 550. A second type of input may indicate a different action. For example, the second type of input may indicate a request to transition to a different sequence of content (i.e. different than sequence 550). The response probability component 402 may determine a probability that a user viewing the candidate content 510c1 and/or 510c2 will provide input of the first and/or second type.

The probability of each input type (or response) may be determined based on information obtained from a historical response database 600. The historical response database 600 may provide aggregated information on responses received from prior presentations of content, such as candidate content 510c1 and 510c2. For example, the response database 600 may store response information indicating a type of input or response received for multiple previous presentations of the candidate content 510c1 and/or 510c2. The historical response database 600 is discussed in more detail with respect to FIG. 6A below. Based on the types of previous input or responses received for particular content, such as candidate content 510c1 and 510c2, the response probability component 402 may determine a probability of a particular input or response being received if/when candidate content 510c1 and/or 510c2 is presented or displayed to the user.

This probability information, shown as "P=x" and "P=y" respectively, is provided to the weight assignment component 404. The weight assignment component 404 may assign weights W1 and W2 to each of the candidate content 510c1 and 510c2 respectively. The weights W1 and W2 may be assigned based at least in part on the probability information provided by the response probability component 402. In some aspects, the weights may equal the probabilities. In other aspects, the weight assignment component may consider multiple other factors when determining a weight to assign to each of the candidate content. For example, factors relating to the content itself may be considered when determining a weight to assign to each of the candidate content 510c1 and 510c2.

The weights W1 and W2 are provided to the content selection component 406. The content selection component 406 then selects which content to present within the media sequence 550 based on the weights.

The selected content 510c is then presented as part of the sequence 550 by the content selection component 406. The selected content 510c (which is derived from either content 510c1 or content 510c2) may be presented in a user interface 512c that is configured to accept the at least two types of input or response. For example, user interface 512c, shown displaying the selected content 510c, in FIG. 5C, is configured to accept at least a swipe left input 554c as the first type of input and a swipe up input 552 as the second type of input. Information relating to the type of input received by the user interface 512c is then provided to the database 600. For example, information relating content 510c to either input 554c or input 552 may be provided to the database 600, depending on which input is provided by a user viewing the content 510c.

Figure 6A:
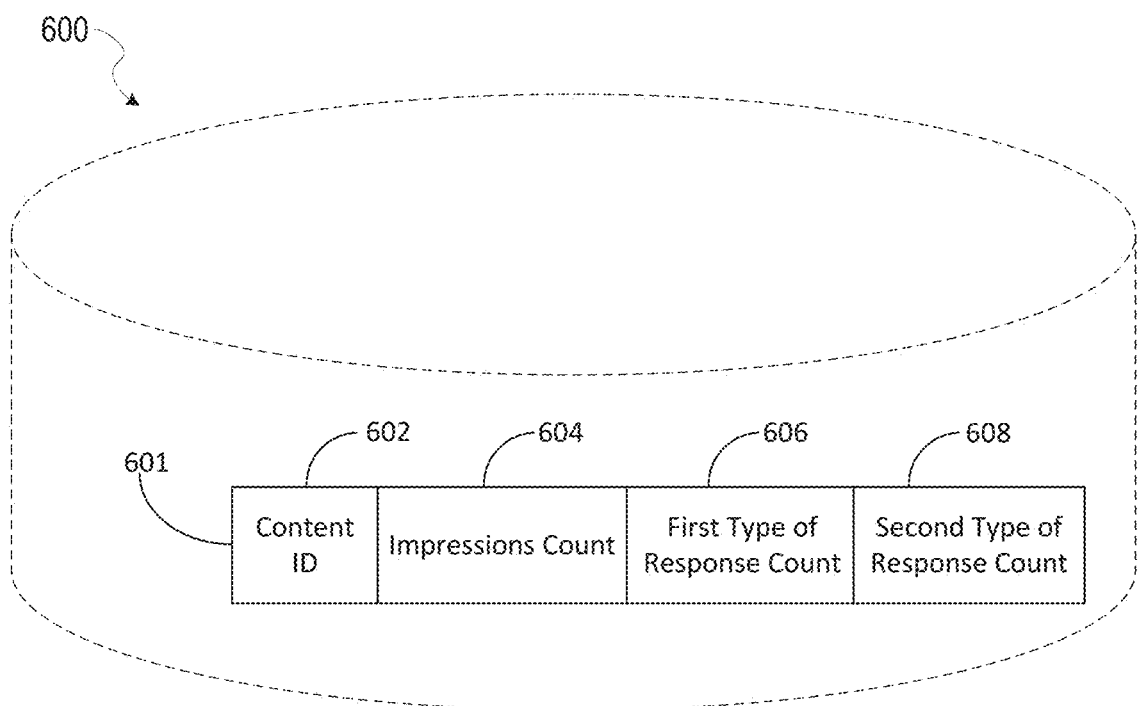
FIGS. 6A-B show a historical response database and a content database respectively.
Figure 6B:
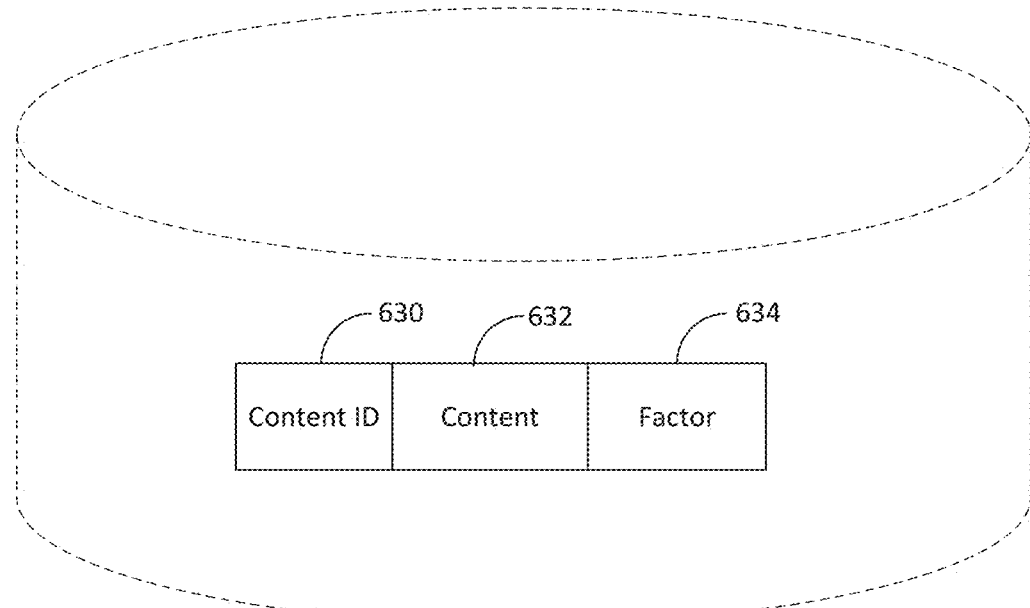

FIGS. 6A-B show a historical response database 600 and a content database 625 respectively. In some aspects, the databases 600 and/or 625 may be included in the database 300, discussed above with respect to FIG. 3.

The historical response database includes a content identification column 602, an impressions count column 604, a first type of response count 606 and a second type of response count 608. The impressions count 604 may provide a count of the number of times a particular content was presented on a display of a user of the messaging system 100. The first type of response count 606 may provide a count of a number of times a first type of response was received in response to presentation of the content identified by the content id column 602. For example, as discussed above with respect to FIG. 5C, the first type of response may indicate a request to advance a sequence of content, such as the sequence of content 500 discussed above with respect to FIG. 5C. The second type of response count column 608 may provide a count of how many times a second type of response was provided in response to presentation of the content identified by the content identification column 602. The historical database 600 may be utilized by the response probability component 402 to compute a probability of the first type of response and the second type of response for a particular content. For example, as discussed above with respect to FIG. 5C, the historical database 600 may be utilized to determine probability indications for the content 510c1 and/or 510c2, shown in FIG. 5C as p=x and p=y respectively.

The counts 604, 606, and/or 608 may be updated in response to input being received by the user interface 512c. For example, as shown in FIG. 5C, the first type of input 554c may be provided to the user interface 512c. Alternatively, the second type of input 552 may be provided to the user interface 512c. Depending on the type of input provided to the user interface 512c, the appropriate count 606 or 608 may be incremented. The impression count 604 may also be incremented.

The content database 625 stores content that may be inserted into a sequence of content, such as sequence 550, discussed above with respect to FIG. 5C. The content database 625 includes a content identification column 630, content column 632, and a factor column 634. The content id 630 and content id 602 may store the same identifier if the same content is referenced in both rows of the historical database 600 and content database 625. The content column 632 may store data that defines the content. For example, if the content is a video, the content column 632 may store the video data (and audio data if audio data is included as part of the video). If the content is a fixed image such as a photo, the content column 632 may store image data defining the photo (such as a jpeg file).

The factor 634 is associated with the content identified by the content id column 630. In some aspects, the factor 634 may be defined at the time the content 632 is created. In some aspects, the factor 634 may be adjusted over time. In some aspects, the factor 634 may be utilized in combination with the probability determined by the response probability component 402 to determine whether the content is selected for presentation.

Figure 7A:
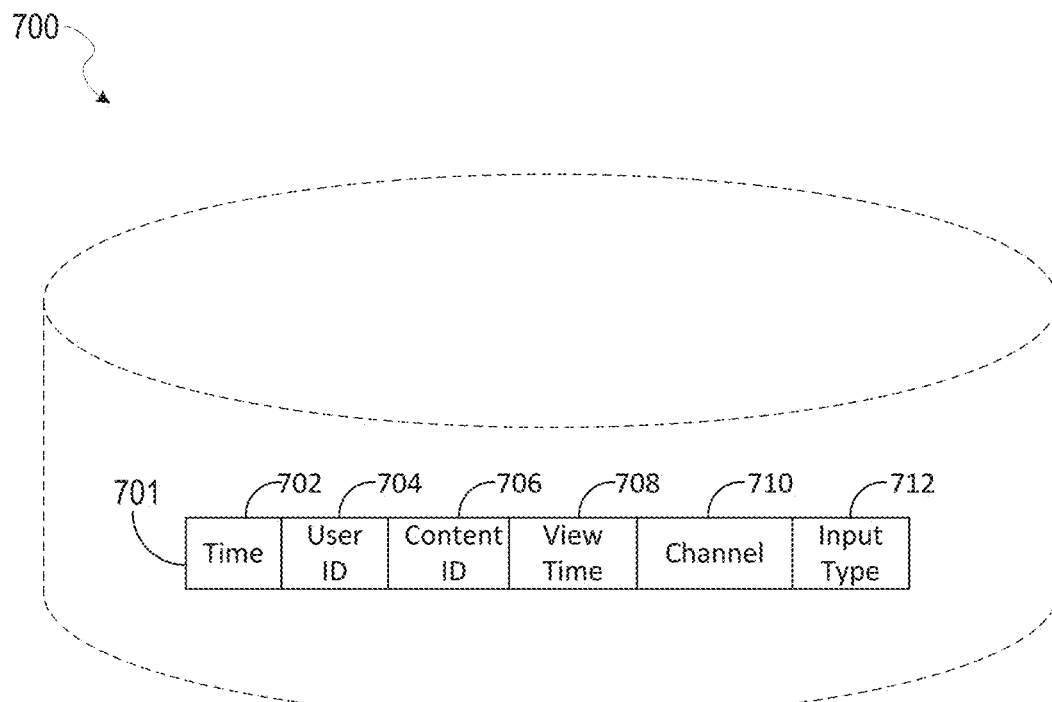
FIGS. 7A-B show two exemplary database schemas.
Figure 7B:
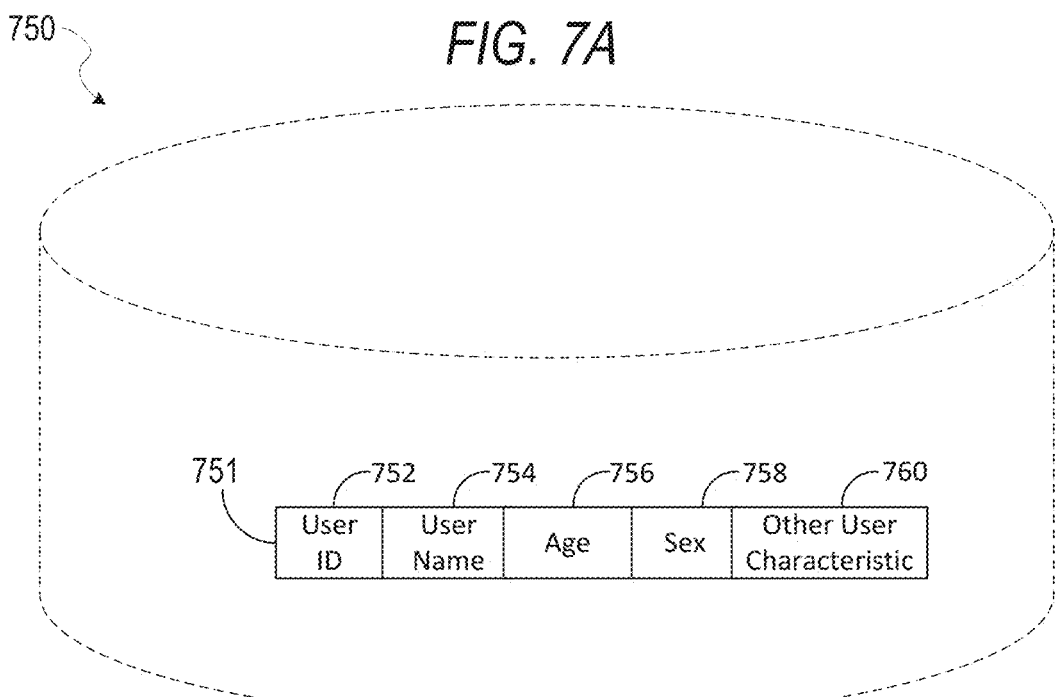

FIGS. 7A-B show two exemplary relational database schemas. First, FIG. 7A shows a relational historical results database 700. FIG. 7A shows one row 701 of the historical results database 700. One of skill would understand that the database 700 may include a plurality of rows 701. Each row 701 may represent a single presentation of content. The row 701 may also represent a response provided by a user in response to the presentation of the content. Each row 701 of the database 700 of FIG. 7A includes a time 702, user identifier 704, content identifier 706, view time 708, channel 710, and input type 712.

The time column 702 stores the time of day in which the content was presented. User id column 704 stores a unique identifier of a user of the messaging system 100. The user identified in user id column 704 identifies a user to which the content was presented. Content identification column 706 identifies the content presented. The content identification 706 column may be equivalent to content identification included in the databases 600 and/or 625, discussed above. The content identification 706 column identifies the content associated with the particular row 701 of the database 700. The view time 708 column stores an amount of time the user viewed the content identified by the content id 706 column during the presentation represented by the row 701. The channel 710 indicates a channel on which the content was presented. The input type 712 stores a type of input provided by the user in response to the content identified by content id 706.

Some aspects may aggregate particular rows 701 of the database 700 to determine a probability that a particular content will provide a particular type of response. In some aspects, the database 700 may be used to generate the database 600, discussed above. For example, rows 701 having a content id 706 of a particular value may be aggregated to form a single row of the database 600. The single row may also include a content id 602 equivalent to the particular value. In some aspects, only rows 701 meeting certain other criteria may be aggregated.

FIG. 7B illustrates an exemplary user database 750. Each row 751 of the user database 750 includes a user id 752, user name 754, age 756, sex 758 of the user. Other user characteristics 760 may also be stored in each row 751. The user identifier 752 may provide a unique identifier for a user of the messaging system 100. The user id 752 and user id 704 fields may store equivalent values. For example, the user id field 704 may identify a user described by a row 751 of the user database 751 and identified by the user id field 752.

In some aspects, data within rows 701 of the database 700 may be aggregated based on characteristics of a user identified by the user id field 704. For example, view time 708 across users sharing some characteristics may be aggregated. For example, in some aspects, only select data within rows 701 for users within a particular age range or sex may be aggregated. Whether a particular user identified by the user id field 704 is within a particular age range may be determined via the user database 750. For example, if the user id 704 matches the user id 752, the corresponding age value 756 indicates the age of the user identified by the user id 704. In some aspects, only rows 701 of the database 700 of users of a particular sex may be aggregated. The sex may be identified in a similar manner as the age range described above, by using the sex field 758 of the database 751.

Figure 8A:
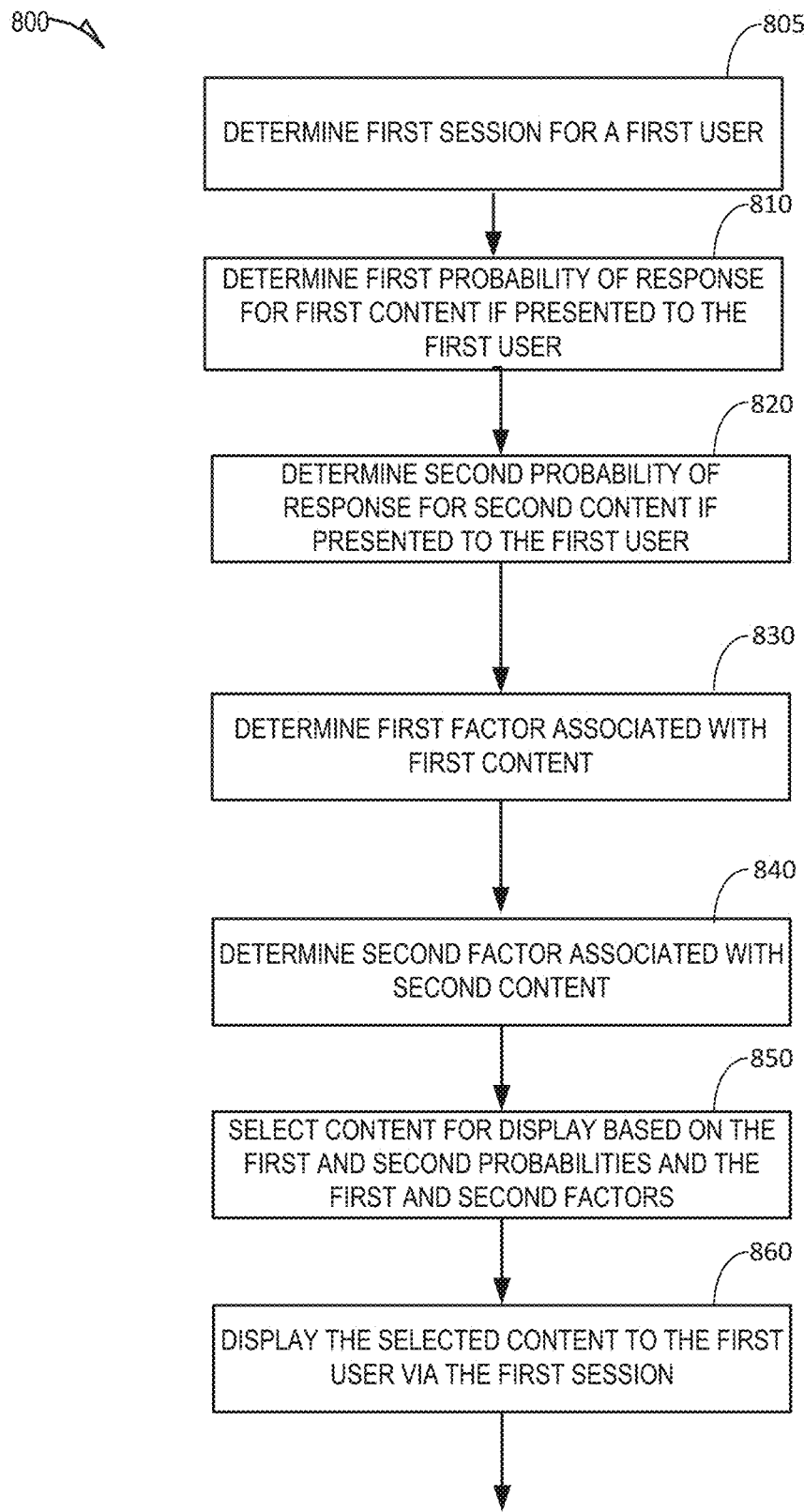
FIG. 8A is a flowchart of a method for displaying content on an electronic display.

FIG. 8A is a flowchart of a method for displaying content on an electronic display. In some aspects, the process 800 discussed below with respect to FIG. 8A may be performed by the client device 102, discussed above with respect to FIG. 1. In some aspects, one or more of the functions discussed below may be performed by the processor 410, discussed above with respect to FIG. 4. For example, one or more of the response probability component 402, weight assignment component 404, content selection component 406, and/or presentation component 408 may store instructions that configure one or more processor 410 to perform one or more of the functions discussed below with respect to FIG. 8A. In some aspects, one or more of the functions discussed below with respect to FIG. 8A may be performed by the machine 1900, discussed below with respect to FIG. 19. For example, in some aspects, instructions 1910 may configure the processor 1904 to perform one or more of the functions discussed below. In some aspects, process 800 may be preceded by a presentation of portions of a sequence of content. For example, as shown in FIG. 5C, user interfaces 512*a-b* may present content 510*a-b*.

In block 805, a first session is established for a first user. The first session may be established, for example, via credentials for the first user such as a user account name and a password. Block 805 may compare user account information (e.g. name and password) received via a user interface and compare it to information stored in a user account database to determine if the session is to be established. Once the session is established, access to information about the user may be available. For example, information relating to characteristics of the user may be available, such as the user's age, gender, address, education level, history of behavior using the social network, and other characteristics that may provide for some level of prediction as to how the user may behave in the future. A user id may also be available for the first user after establishment of the session. For example, a system performing process 800 may identify a user id, such as the user id 704 or 752 discussed above.

In block 810, a first probability of response for a first content by the first user is determined. For example, in some aspects, block 810 may determine a probability of a response of a first type to the first content. In some aspects, block 810 may determine a second probability of a response of a second type to the first content. As discussed above, in some aspects, the response probability component 402 may determine a probability of response based on the response database 600. In some aspects, the probability may be based on historical responses to the first content. In some aspects, the probability may be determined via equation 1 below:

$$P_tC = \text{num responses of type } t / \text{total presentations of } C, \quad (1)$$

where:
$P_t$=probability that a response of type t will be provided
C=particular content In some aspects, the number of responses of type t may be stored in the historical response database 600, discussed above with respect to FIG. 6A. For example, the column 606 may store a count of the number of responses of a first type, while the column 608 may store a count of a number of responses of a second type. The impressions count 604 of the database 600 may store the total number of presentations of content C, which may be utilized in equation (1) above.

Figure 20:
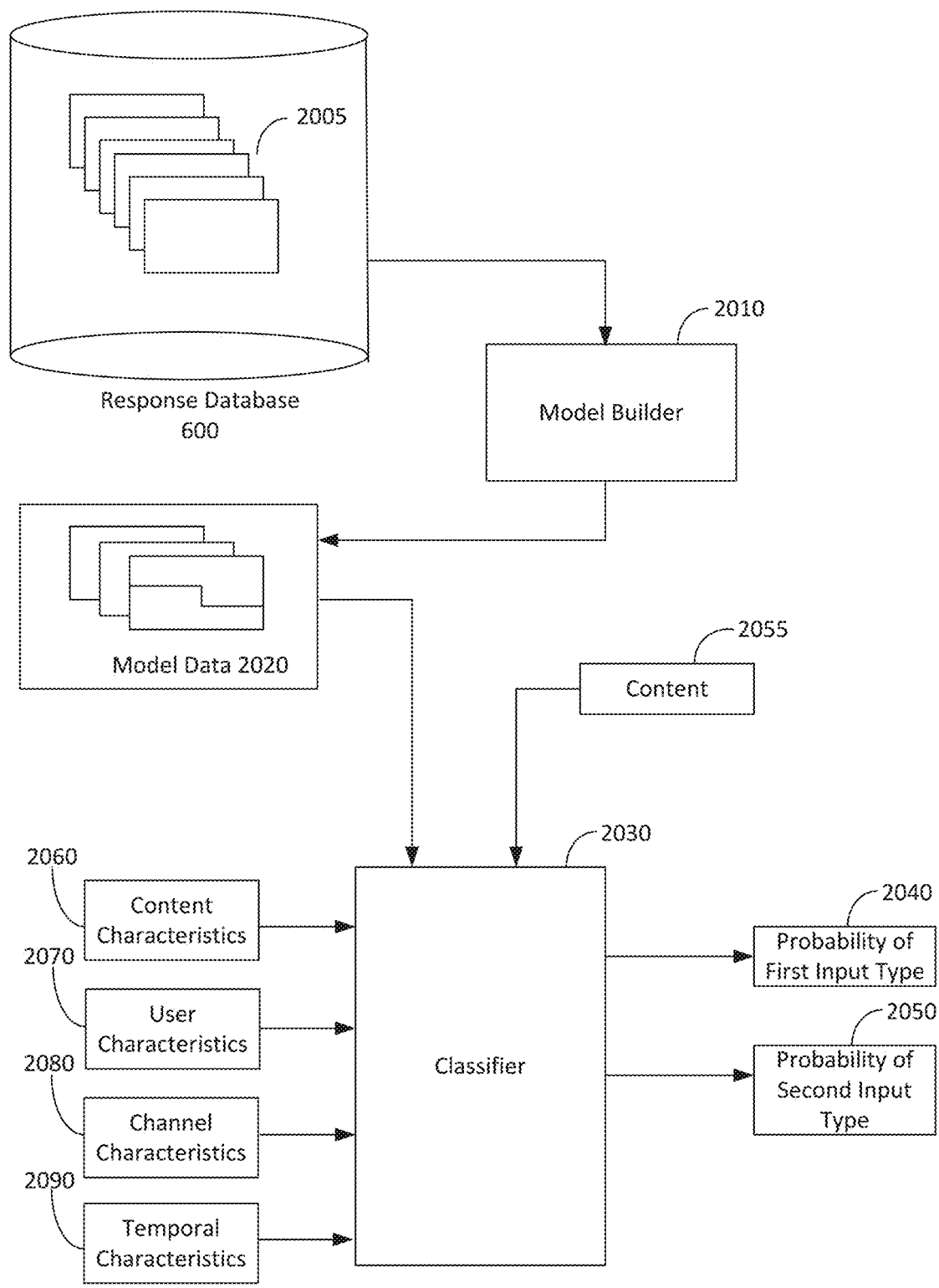
FIG. 20 is an exemplary data flow diagram of a process employing a predictive model to determine probabilities of different types of responses to particular content.

In some aspects, block 810 may employ machine learning to determine the first probability. As described above with respect to the response probability component 402, machine learning may be utilized to generate the first probability. To that end, a variety of input parameters may be provided to a model, and the model may generate the first probability based on correlations between the input parameters and historical results, such as those stored in the historical result database 700. An example of input parameters for a model utilized to generate the first probability, and weightings for the input parameters is shown below in FIG. 8B. FIG. 20 provides one exemplary dataflow of one embodiment of using machine learning to determine the first probability.

In block 820, a second probability of response is determined for a second content. In some aspects, block 820 may determine a first probability that a response of a first type (such as a swipe left) may be received in response to presentation of the second content. In some aspects, block 820 may determine a second probability that a response of a second type (such as a swipe up) will be received in response to presentation of the second content. As illustrated above in FIG. 5C, the response probability component may determine response probabilities for content. In some aspects, block 820 may utilize Equation 1, discussed above, to determine the response probability for the second content. For example, the historical response database 600 may include a row for the second row for the second content. Thus, the first type of response count 606 in the row may provide a number of times the first type of response has been received for the second content. The second type of response count 608 in the second row may provide a number of times the second type of response has been received for the second content. The impressions count 604 in the second row may store a total number of times the second content has been presented or displayed. In some aspects, this information, in combination with Equation 1 above, may be used to determine a probability of response for the second content.

In some aspects, block 820 may employ machine learning to determine the second probability. As described above with respect to the response probability component 402, a variety of input parameters may be provided to a model, and the model may generate the probability based on correlations between the input parameters and historical results, such as those stored in the historical result database 700. An example of input parameters for a model utilized to generate the second probability, and weightings for the input parameters are shown below in FIG. 8B. FIG. 20 describes an exemplary dataflow of an embodiment that uses a model to provide probabilities that a first and/or second type of input will be received in response to presentation of particular content.

In block 830, a first factor associated with the first content is determined. In some aspects, the first factor may be obtained from the content database 625. For example, the factor 634 may store a value for the factor for content identified by the content identifier 630.

In block 840, a second factor associated with the second content is determined. As with the first factor for the first content, the second factor may be obtained from the content database 625 in some aspects. For example, the content database 625 may include a first row for the first content and a second row for the second content. The factor 634 in the second row may store a value of the second factor for the second content, while the factor 634 in the first row may store a value of the first factor for the first content.

In block 850, content is selected for display based on the first and second probabilities and the first and second factors. In some aspects, the first probability is multiplied by the first factor to determine a first weight. In some of these aspects, the second probability is multiplied by the second factor to determine a second weight. The selection may be performed based on a comparison of the first and second weights in some aspects. For example, content with the highest weight may be selected in some aspects. In other aspects, content with the lowest weight may be selected. In still other aspects, other considerations, in addition to the first and second weights, may be considered when selecting between the first and second content.

In block 860, the selected content is displayed. For example, as described above with respect to FIG. 5C, a first content 510c1 and a second content 510c2 may be analyzed. The content selection component 406 may select one of the content 510c1 and 510c2 to select content 510c, which is presented for display as part of the sequence 550. The selected content may be include in a user interface, such as user interface 512, which provides for at least two types of input. The first type of input indicates a request to continue the sequence of content. For example, reception of the first type of input 554c may indicate a request to continue the sequence 550 and display content 510d in user interface 512d.

Selecting which content is displayed may have substantial technical effects on a social networking system. For example, each content may facilitate different types of user interactions. A first content may allow a user to play a video. A second content may allow a user to add a friend relationship within the social network. A third content may launch a $3^{rd}$ party application. The $3^{rd}$ party application, may, for example, schedule an autonomous vehicle to pick up the first user at a location indicated by the client device of the first user. Another content may allow a user to adjust settings on their mobile device.

Figure 8B:
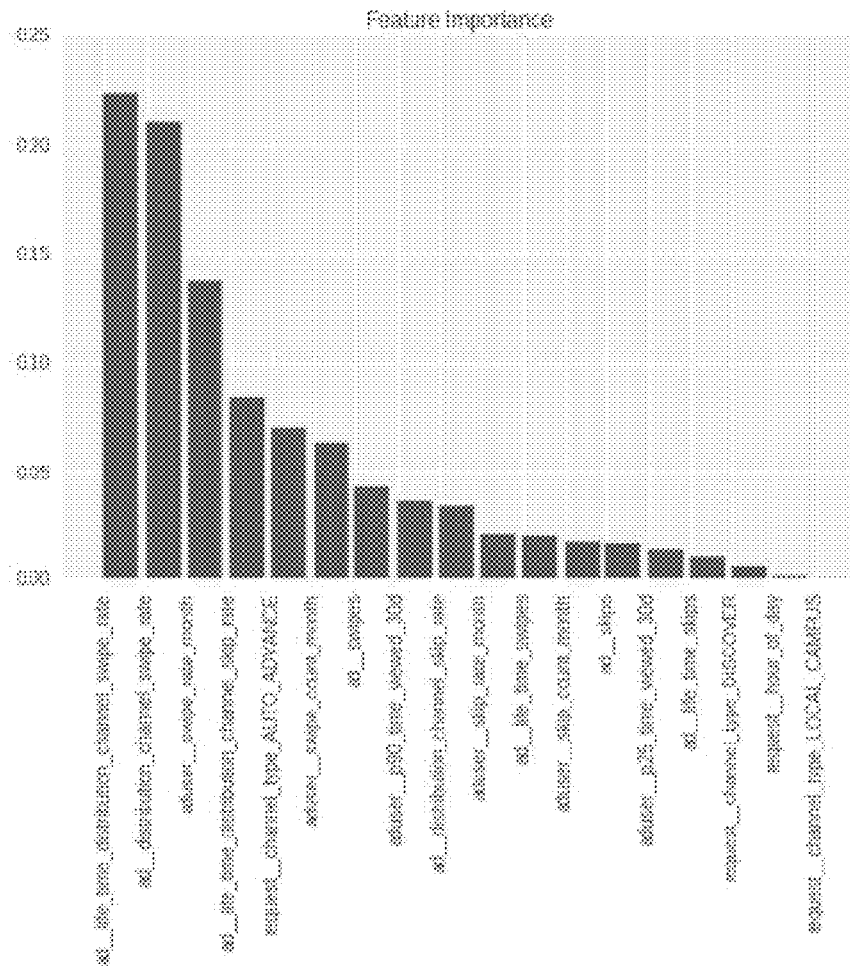
FIG. 8B is a graph showing weightings for model input parameters.

FIG. 8B shows an exemplary weighting of input parameters to a model for determining one or more of the first and second probabilities discussed above with respect to blocks 810 and/or 820 of process 800. The input parameters to the model may include a life time distribution channel swipe rate for the content, a distribution channel swipe rate for the content, a swipe rate for a month by the user, a lifetime distribution channel skip rate for the content, a swipe count for a previous month for the content, a total number of swipes for the content, an amount of time a user has viewed content within the past 30 days, a distribution channel skip rate for the content, a skip rate per month for the user, a lifetime number of swipes for the content, a number of skips the user has performed in the preview month, a number of times the content has been skipped by all users, a number of times the user has viewed content in the past 30 days, a life time number of skips for the content, whether the content is displayed over a discovery channel, a time of day or day of week or month in which the content is displayed.

Figure 9:
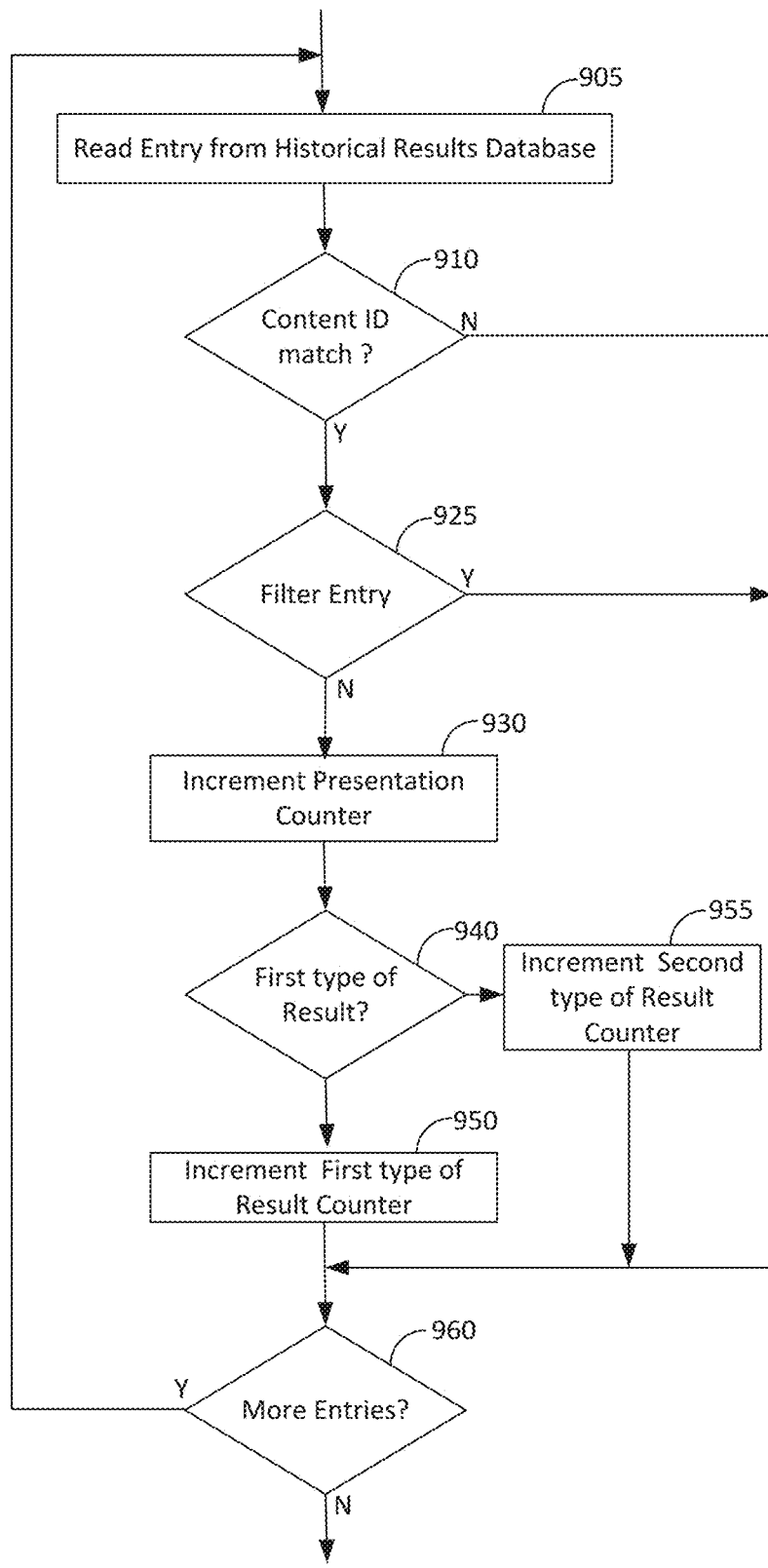
FIG. 9 is a flowchart for a method of aggregating statistics for presentation of content.

FIG. 9 is a flowchart for an exemplary method of aggregating statistics for presentation of particular content. The particular content may potentially be presented to a particular user, and the presentation of the content may have been requested by a particular channel. In some aspects, the process 900 discussed below with respect to FIG. 9 may be utilized by one or more of blocks 810 and/or 820, discussed above with respect to FIG. 8A. For example, block 810 and/or 820 may aggregate historical results for prior presentations of particular content, in order to predict the likelihood of a particular result when that content is presented again. The particular content may have a particular identifier that identifies it. This identifier may be the content identifier discussed above with respect to the databases 600, 625, and 700. In some aspects, a prediction model may be used for determining the probabilities of blocks 810 and/or 820. The model may incorporate at least portions of process 900, and may also incorporate additional factors not reflected in the exemplary method of process 900 discussed below.

In some aspects, prior presentations of content sharing characteristics of the particular content may be considered by process 900. In some aspects, only presentations to users sharing one or more characteristics with the particular user to which the subject content will be presented are considered by process 900. In some aspects, only presentations to channels similar or equivalent to the particular channel requesting the presentation will be considered. For example, in some aspects, a probability that a user within a certain age range or gender will respond in a particular way is determined by blocks 810 and/or 820. In these aspects, process 900 may filter out historical entries for users not matching the desired criteria.

Process 900 may determine a total number of presentations of a particular content. This information may be stored, in some aspects, in the impressions count column 604, discussed above with respect to database 600. Process 900 may also determine, of the total number of impressions, how many generated a response of a particular type. For example, process 900 may determine how many presentations generated responses of a first type and/or of a second type. This information may be stored in one or more of the first type of response count 606, and/or the second type of response count 608, as discussed above with respect to FIG. 6A and database 600.

In block 905, an entry or row of a historical results database is read. In some aspects, the historical results database may take the form of the historical results database 700, discussed above with respect to FIG. 7A. Decision block 910 determines whether the entry in the historical results database is for the particular content process 900 is aggregating. If not, process 900 moves to decision block 960. If the entry is for the particular content, process 900 moves from decision block 910 to decision block 925, which determines whether the presentation of the content matches one or more criteria. For example, in some aspects, probability determinations may be based on prior presentation results obtained for content having similarities to the particular content, presentation results for users sharing one or more characteristics with the particular user, and prior presentation to channels sharing one or more characteristics with the particular channel If the presentation of the particular content identified in block 905 does not match the specific conditions relating to one or more of the content, the user, and/or the channel, then the current entry is not considered and process 900 moves to block 960. Otherwise, a presentation counter is incremented in block 930. In some aspects, block 930 may increment a presentation counter stored in the impressions count field 604, discussed above with respect to database 600.

Decision block 940 determines whether a result of the presentation of the content identified in block 905 was a first type of response. If it was, then process 900 moves to block 950, which increments a counter associated with the first type of response. In some aspects, block 950 may increment the first type of response count 606, discussed above with respect to FIG. 6A.

If the response was not the first type, then process 900 moves to block 955, which increments a second type of result counter. For example, in some aspects, block 955 may increment the second type of response count 608, discussed above with respect to FIG. 6A.

Block 960 determines if there are additional entries (rows) in the historical response database. If so, processing returns to block 905. Otherwise, processing continues below.

Figures 10A, 10B:
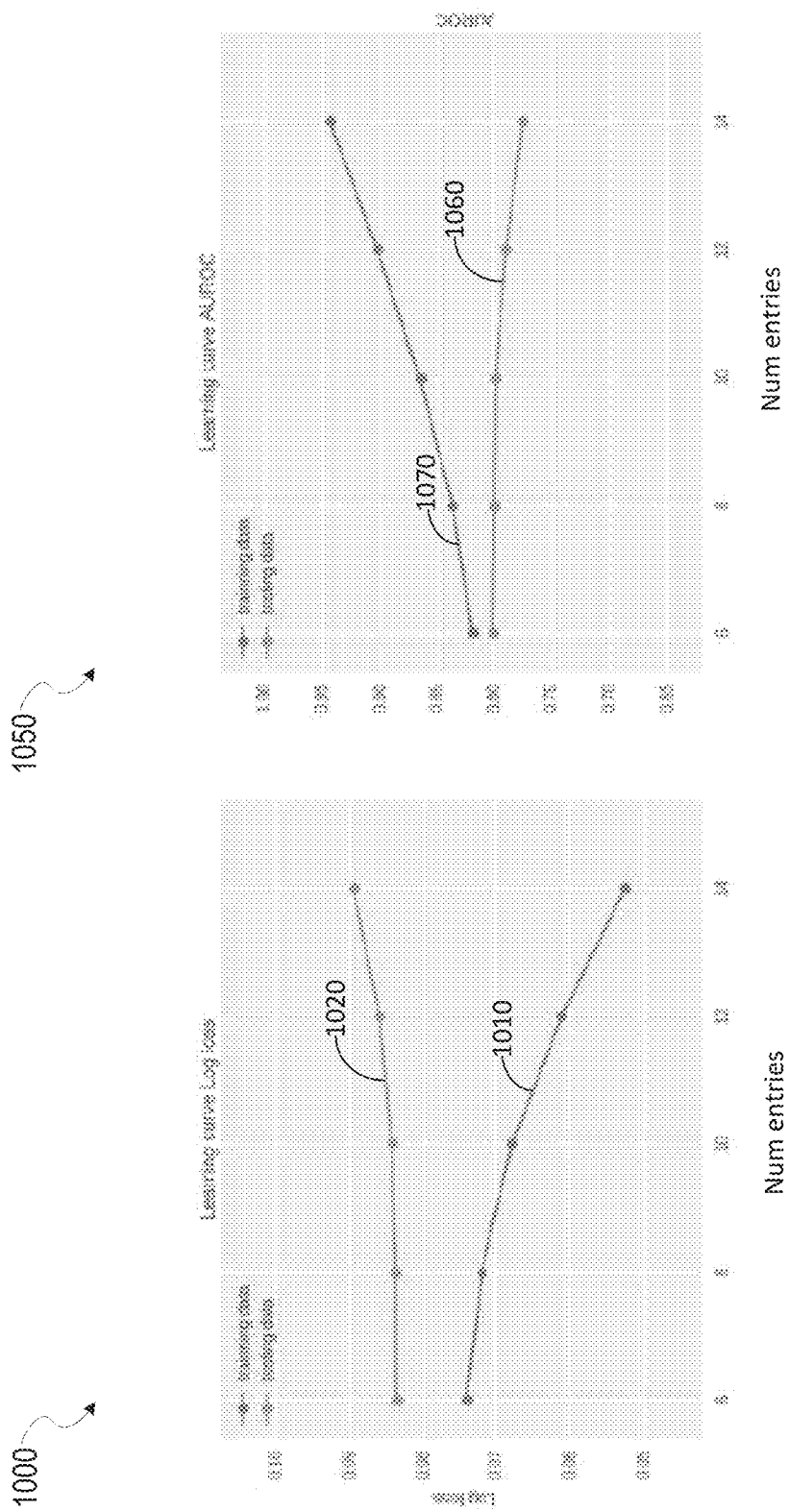
FIGS. 10A-B show results of one implementation of a prediction model utilized by the disclosed methods and systems.

FIGS. 10A-B show results of one implementation of a prediction model utilized by the disclosed methods and systems. Graph 1000 shows two graphs, a log loss graph 1000 and an area under a receiver operative characteristics curve (AUROC). An x-axis for each of the graphs 1000 and 1050 may represent a number of entries. In some aspects, this may reflect a number of trees utilized for the model. In some aspects, a random forest may be utilized in the model. In some aspects, ten (10) trees having eight (8) depths may be utilized. As the curve moves to the right in the two graphs, more entries are utilized, representing increasing model complexity.

Graphs 1000 and 1050 show training data 1010 and 1070 respectively, and testing data 1020 and 1060 respectively. As an area under the receiver operative characteristics curve increases, one may consider that the measured model is doing a better job differentiating positive and negative examples. As shown by graphs 1000 and 1050, log loss and AUROC may change at different rates. This may occur, in some aspects, when a model improves with respect to one area, but not another. The two areas may affect the scores in log loss and AUROC differently. As shown by graph 1000, the training data 1010 exhibits lower log losses than the testing data 1020. In contrast to the data shown in graph 1000, in graph 1000, the training data 1060 exhibits greater log losses than the testing data 1070.

Figure 11:
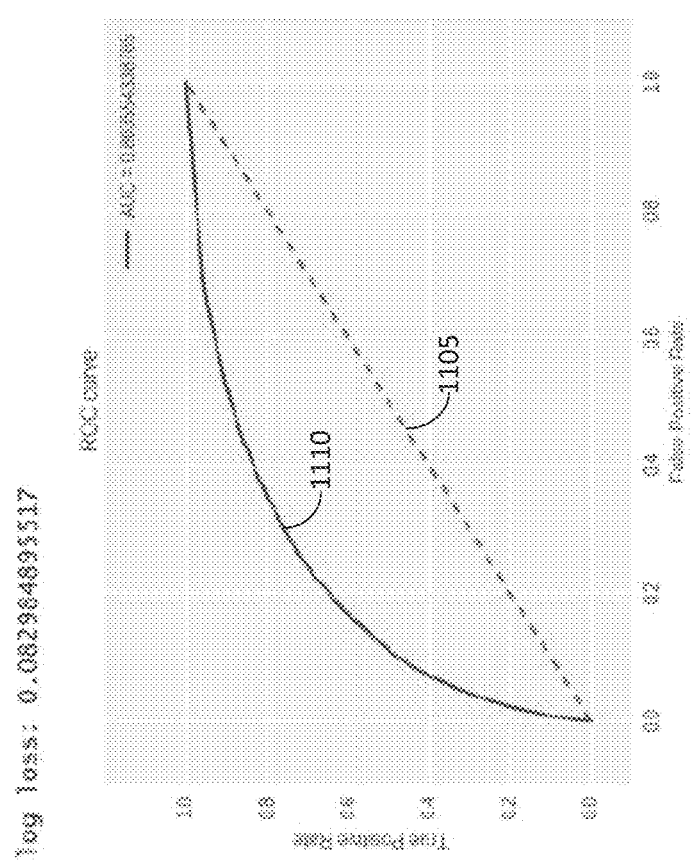
FIG. 11 is an exemplary receiver operating characteristic curve. As the area under the curve increases, the precision of a model generating the curve is improving.

FIG. 11 is an exemplary receiver operating characteristic curve. As the area under the curve increases, the precision of a model generating the curve is improving.

Figure 12:
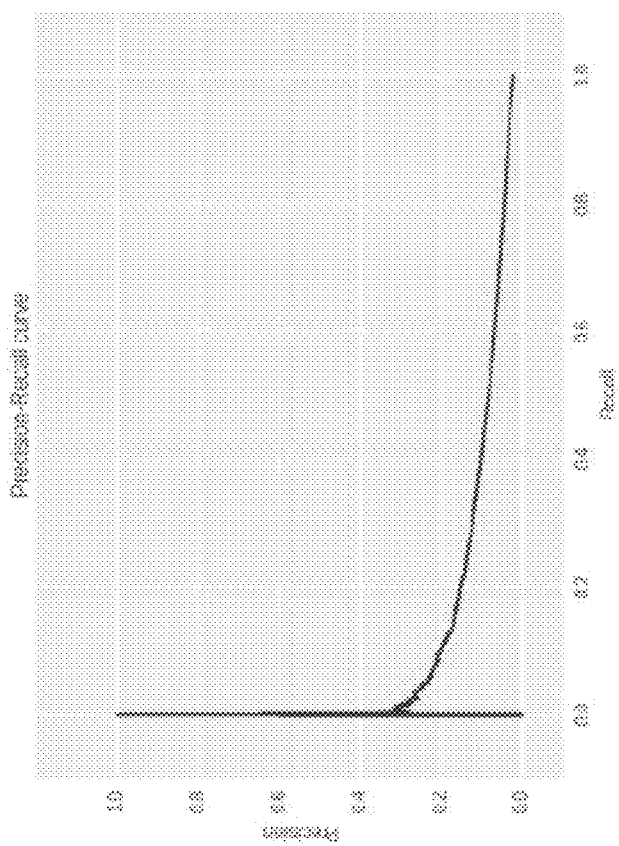
FIG. 12 is an exemplary precision recall curve for one implementation of a model utilized in the disclosed systems and methods.

FIG. 12 is an exemplary precision recall curve for one implementation of a model utilized in the disclosed systems and methods.

Figure 13:
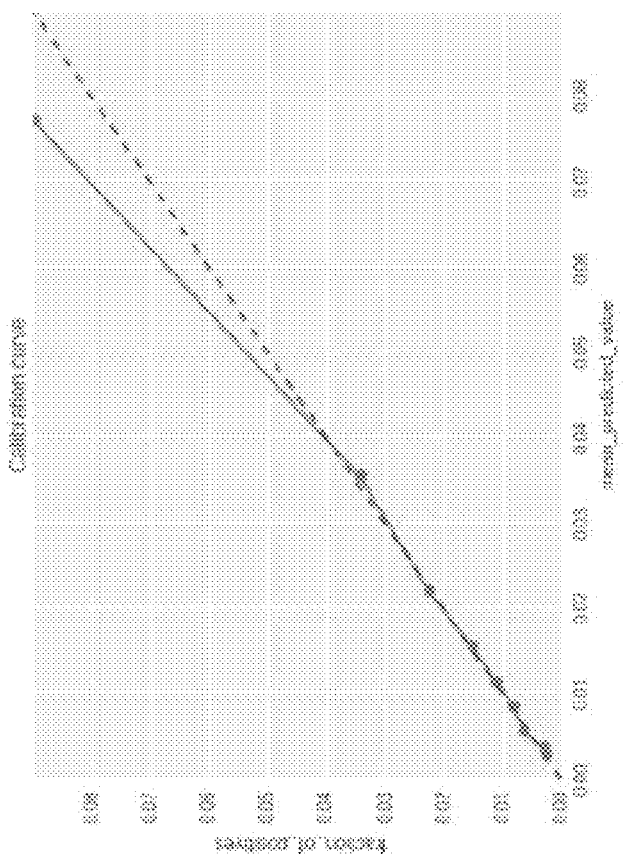
FIG. 13 shows a calibration of a prediction model utilized by some of the disclosed methods and systems.
Figure 14A:
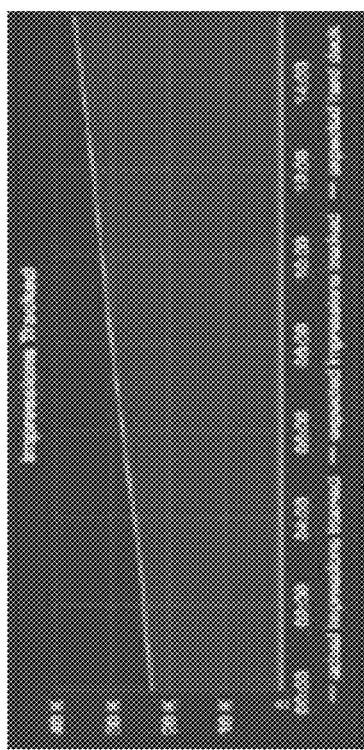
FIG. 14A-D show four graphs 1400a-d respectively, the graphs showing data that may be monitored and utilized by some models of the disclosed methods, devices, and systems.
Figure 14B:
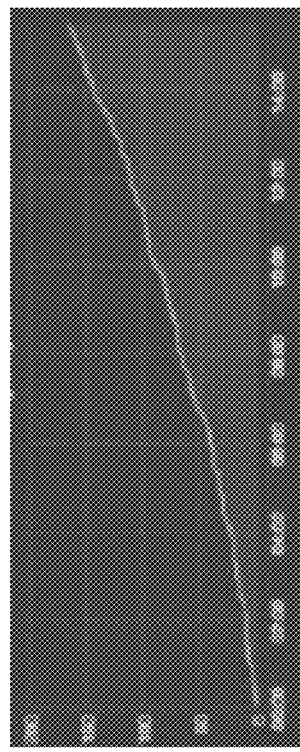
Figure 14C:
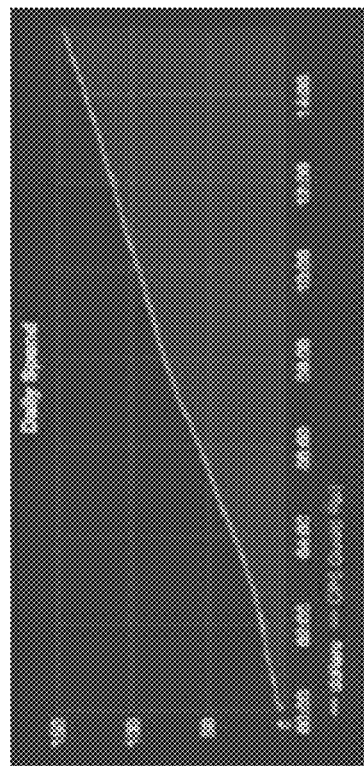
Figure 14D:
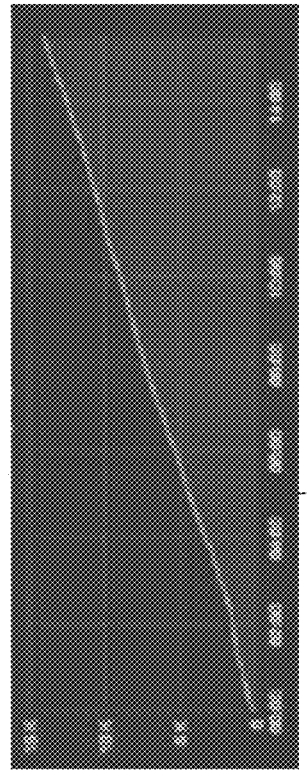

FIG. 13 shows a calibration of a prediction model utilized by some of the disclosed methods and systems. The predictions made by the model compare favorably to actual results with lower mean predicted values. As the mean predicted value increases, differences between the predicted value and action results begin to diverge. Calibration effectively captures how "accurately" a model is performing. For example, if over the course of 1000 impressions, the model predicted 100 swipes (we sum all swipe-probabilities over these 1000 impressions), the calibration of the model may be measured by determining a number of swipes that actually occurred. If 100 swipes resulted from the 1000 impressions, the model used for the predictions would be perfectly calibrated.

FIGS. 14A-D show four graphs 1400a-d respectively, the graphs showing data that may be monitored and utilized by some models of the disclosed methods, devices, and systems. Graph 1400a shows that an amount of money spent per day may be monitored. Graph 1400b shows that a number of daily impressions may be monitored. Graph 1400c shows that a number of impressions tracked may be monitored. In other words, results of impressions may be tracked to determine whether the results of impressions are lining up well with predictions made by the model. Graph 1400d shows that a number of swipes in response to content provided may be tracked.

Figure 15A:
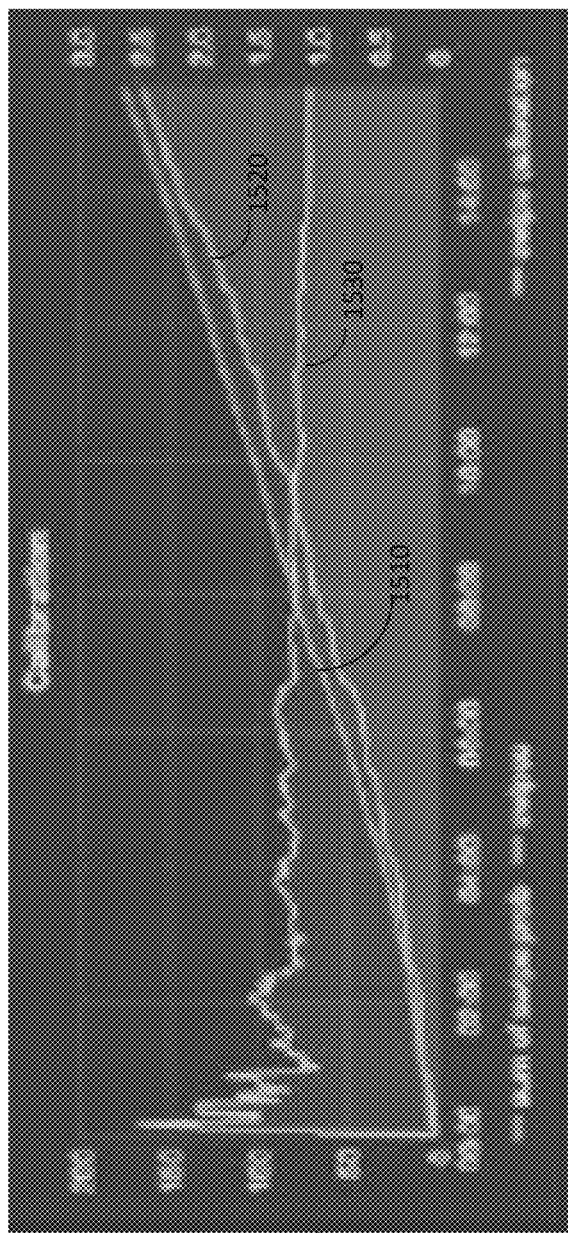
FIG. 15A shows a line graph of a sum of swipe probabilities predicted by a particular time of day.
Figure 15B:
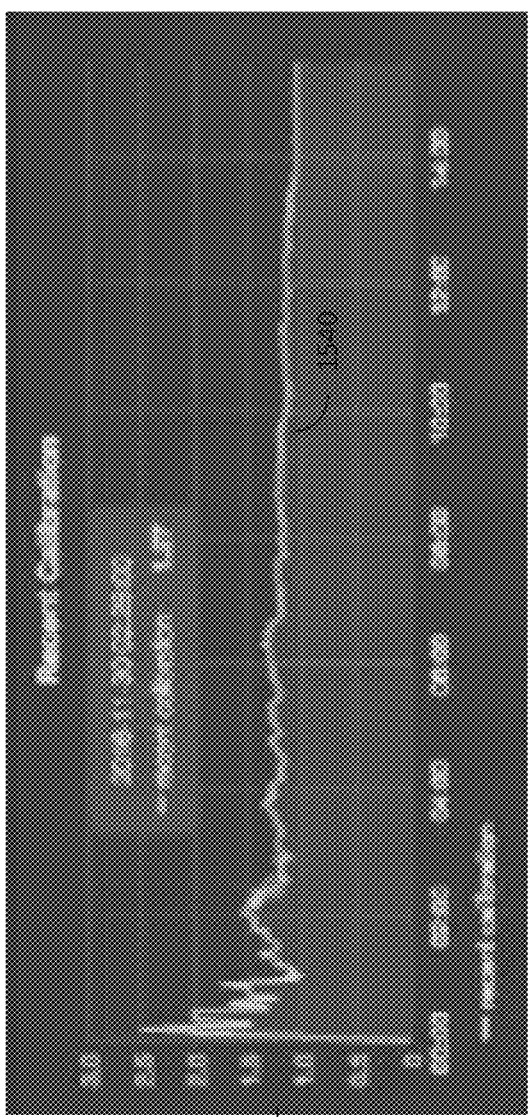
FIG. 15B shows a line graph of a number of swipes performed by a particular time of day.

FIGS. 15A-B show two graphs 1500a-b respectively. Graph 1500a shows a first line graph 1510 showing a sum of swipe probabilities predicted by a particular time of day. A second line graph 1520 shows a number of swipes performed by a particular time of day. If the first line graph 1510 and second line graph 1520 were to match exactly, a model providing the predictions of the first line graph 1510 would be perfectly calibrated. The graph 1500a shows that the first and second line graphs diverge to some extent. This divergence is represented by a third line graph 1530 showing calibration of the model providing the swipe predictions.

Graph 1500b includes a line graph 1540 showing calibration of the model over time. A calibration value of 1.0 represents a perfectly calibrated model. Graph 1500b shows the model converging toward a perfect calibration as results accumulate and the model is refined.

Figure 16:
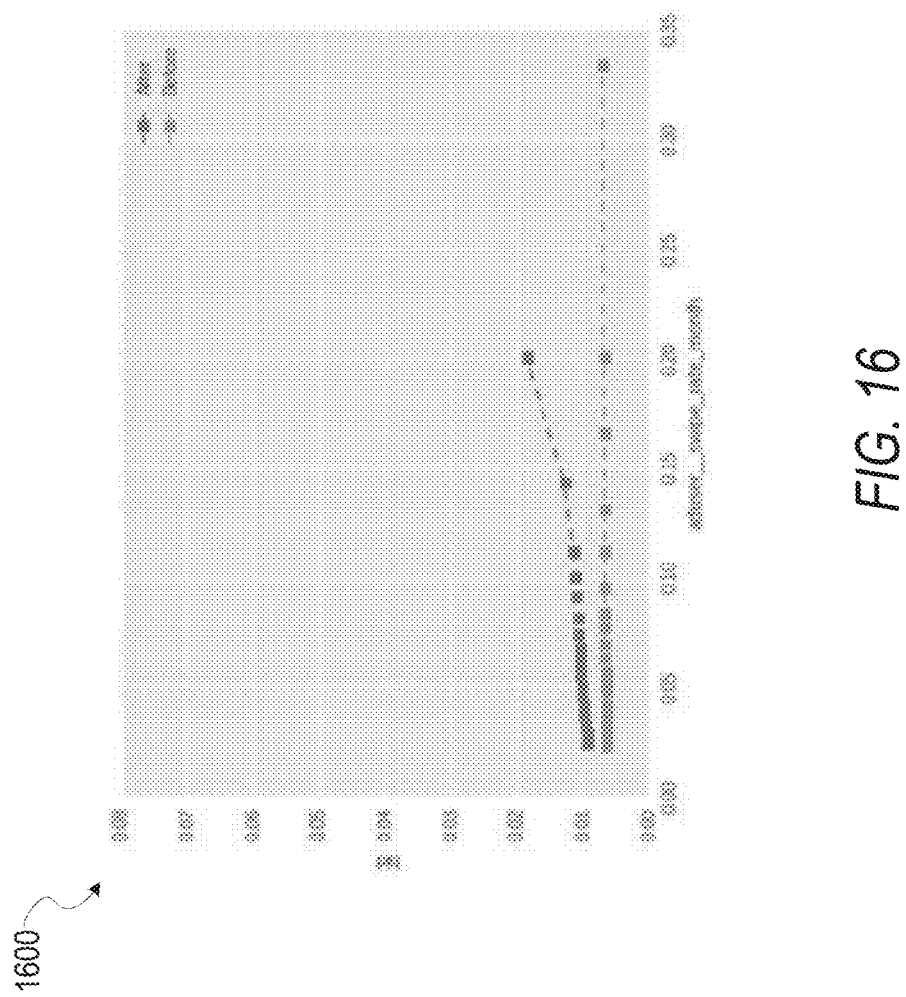
FIG. 16 shows bid prices for impressions to a user increasing as the user's frequency of swipes increases.

FIG. 16 shows results of the disclosed methods, systems, and devices. Graph 1600 shows that as a user's frequency of swipes increases, bid prices for that user also increase. This demonstrates that the disclosed methods, systems, and devices are providing higher value for presentations of content to users that are more likely to swipe.

FIG. 17A shows a graph 1750 of bid prices for presentation of content. FIG. 17B shows a graph 1700 of actual prices paid for presentation of content.

Software Architecture

Figure 18:
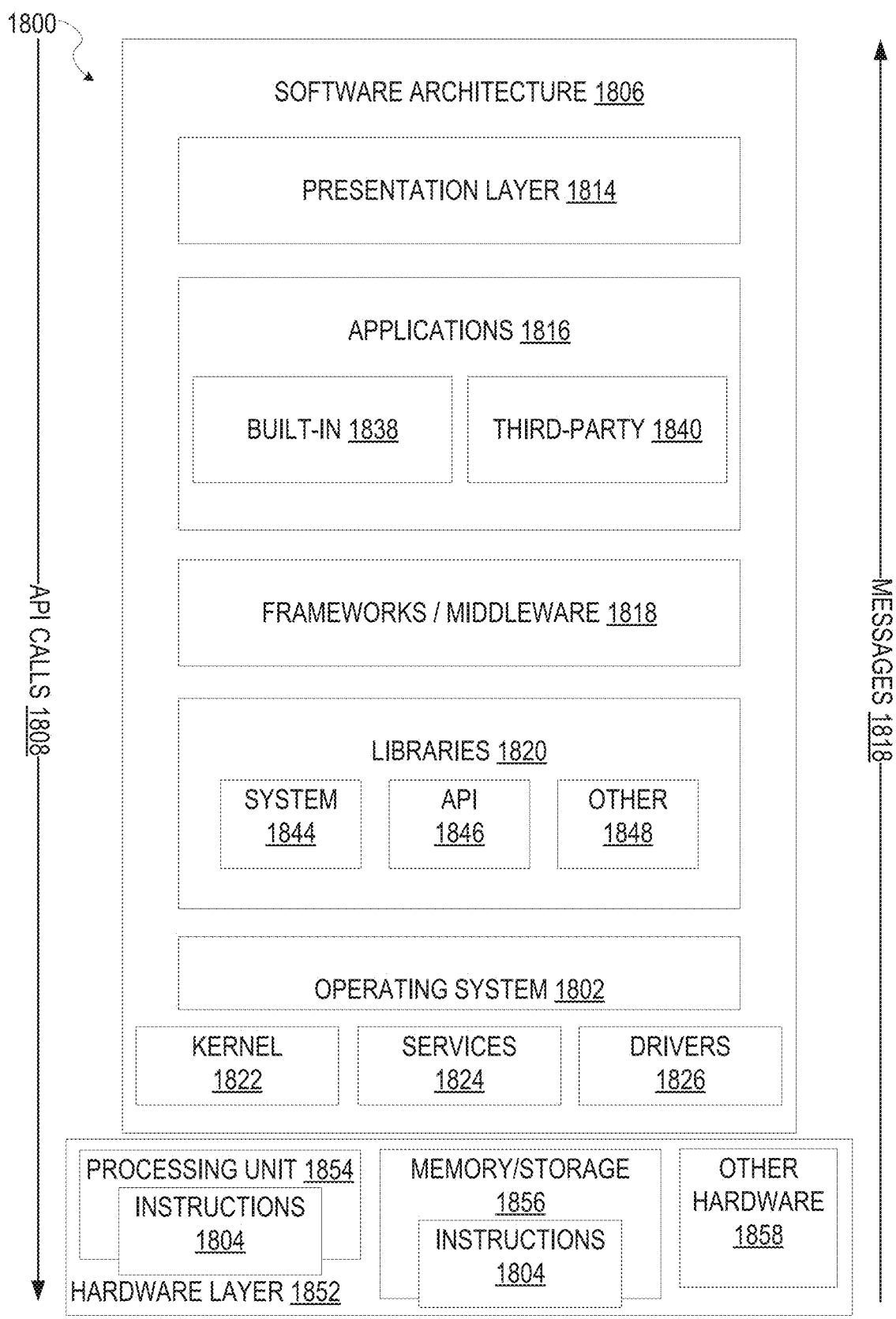
FIG. 18 is a block diagram illustrating an example software architecture

FIG. 18 is a block diagram illustrating an example software architecture 1806, which may be used in conjunction with various hardware architectures herein described. FIG. 18 is a non-limiting example of a software architecture and it will be appreciated that many other architectures may be implemented to facilitate the functionality described herein. The software architecture 1806 may execute on hardware such as a machine 1900 of FIG. 19 that includes, among other things, processors 1804, memory/storage 1806, and I/O components 1818. A representative hardware layer 1852 is illustrated and can represent, for example, the machine 1900 of FIG. 19. The representative hardware layer 1852 includes a processing unit 1854 having associated executable instructions 1804. The executable instructions 1804 represent the executable instructions of the software architecture 1806, including implementation of the methods, components, and so forth described herein. The hardware layer 1852 also includes memory and/or storage 1856, which also have the executable instructions 1804. The hardware layer 1852 may also comprise other hardware 1858.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 18, the software architecture 1806 may be conceptualized as a stack of layers where each layer provides particular functionality. For example, the software architecture 1806 may include layers such as an operating system 1802, libraries 1820, frameworks/middleware 1818, applications 1816, and a presentation layer 1814. Operationally, the applications 1816 and/or other components within the layers may invoke API calls 1808 through the software stack and receive a response as messages 1810. The layers illustrated are representative in nature and not all software architectures have all layers. For example, some mobile or special-purpose operating systems may not provide a frameworks/middleware 1818 layer, while others may provide such a layer. Other software architectures may include additional or different layers.

The operating system 1802 may manage hardware resources and provide common services. The operating system 1802 may include, for example, a kernel 1822, services 1824, and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than by interfacing directly with the underlying operating system 1802 functionality (e.g., kernel 1822, services 1824, and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. The third-party applications 1840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1840 may invoke the API calls 1808 provided by the mobile operating system (such as the operating system 1802) to facilitate functionality described herein.

The applications 1816 may use built-in operating system functions (e.g., kernel 1822, services 1824, and/or drivers 1826), libraries 1820, and frameworks/middleware 1818 to create user interfaces to interact with users of the system. Alternatively, or additionally, in some systems interactions with a user may occur through a presentation layer, such as the presentation layer 1814. In these systems, the application/component "logic" can be separated from the aspects of the application/component that interact with a user.

Exemplary Machine

Figure 19:
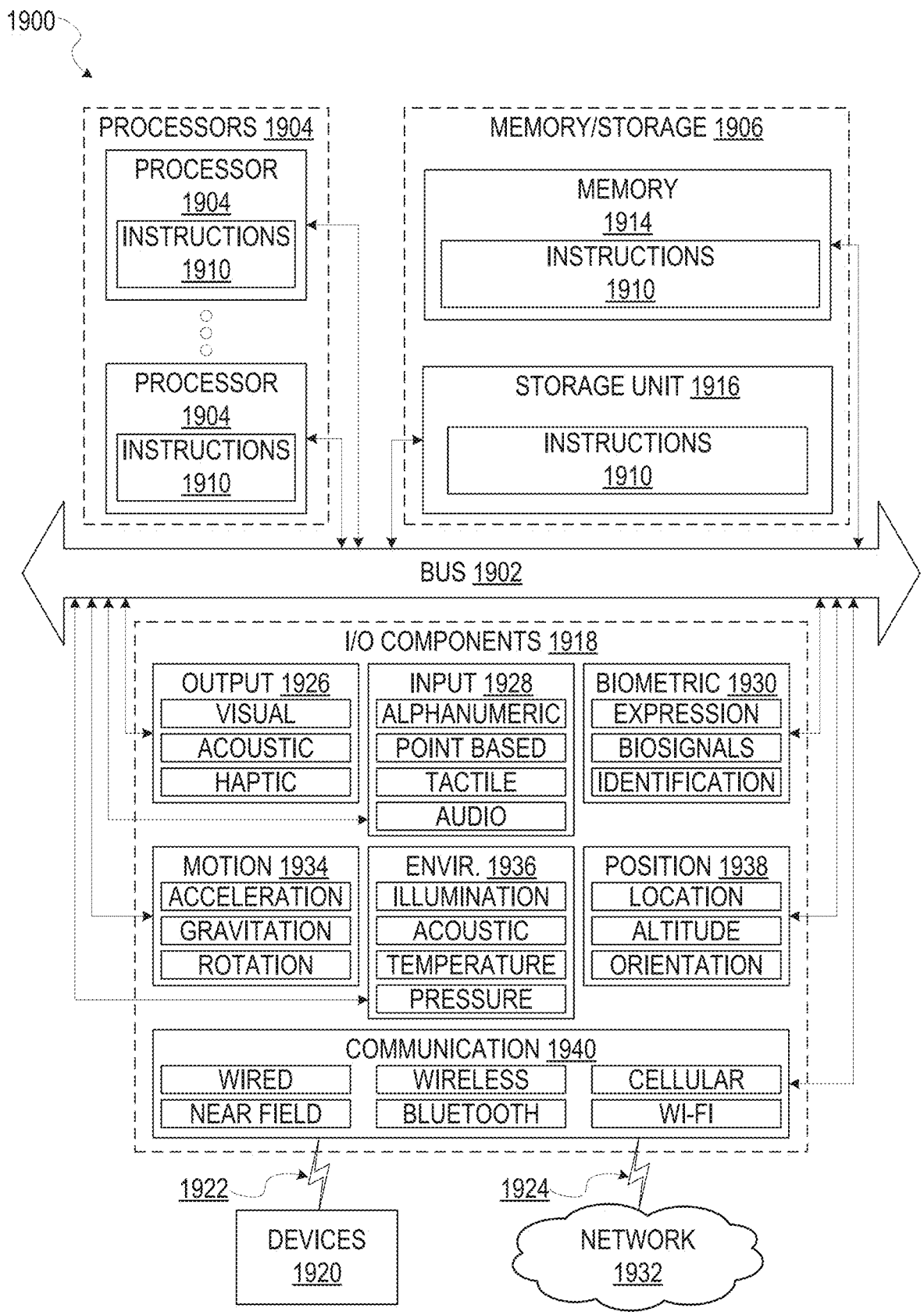
FIG. 19 is a block diagram illustrating exemplary components (also referred to herein as "modules") of a machine.

FIG. 19 is a block diagram illustrating exemplary components (also referred to herein as "modules") of a machine 1900. In some aspects, the machine is configured to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1910 (e.g., software, a program, an application, an applet, an app, or other executable code) for causing the machine 1900 to perform any one or more of the methodologies discussed herein may be executed. As such, the instructions 1910 may be used to implement modules or components described herein. The instructions 1910 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1910, sequentially or otherwise, that specify actions to be taken by machine 1900. Further, while only a single machine 1900 is illustrated, the term "machine" shall also be taken to include a collection of machines that individually or jointly execute the instructions 1910 to perform any one or more of the methodologies discussed herein.

The machine 1900 may include processors 1904, memory/storage 1906, and I/O components 1918, which may be configured to communicate with each other such as via a bus 1902. The memory/storage 1906 may include a memory 1914, such as a main memory, or other memory storage, and a storage unit 1916, both accessible to the processors 1904 such as via the bus 1902. The storage unit 1916 and memory 1914 store the instructions 1910 embodying any one or more of the methodologies or functions described herein. The instructions 1910 may also reside, completely or partially, within the memory 1914, within the storage unit 1916, within at least one of the processors 1904 (e.g., within the processor's cache memory), or any suitable combination thereof, during execution thereof by the machine 1900. Accordingly, the memory 1914, the storage unit 1916, and the memory of the processors 1904 are examples of machine-readable media. In some aspect, the processors 410 and processors 1904 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1918 may include a wide variety of components to provide a user interface for receiving input, providing output, producing output, transmitting information, exchanging information, capturing measurements, and so on. The specific I/O components 1918 that are included in the user interface of a particular machine 1900 will depend on the type of machine. For example, portable machines such as mobile phones will likely include a touch input device or other such input mechanisms, while a headless server machine will likely not include such a touch input device. It will be appreciated that the I/O components 1918 may include many other components that are not shown in FIG. 19. The I/O components 1918 are grouped according to functionality merely for simplifying the following discussion and the grouping is in no way limiting. In various exemplary embodiments, the I/O components 1918 may include output components 1926 and input components 1928. The output components 1926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1928 may also include one or more image-capturing devices, such as a digital camera for generating digital images and/or video.

In further exemplary embodiments, the I/O components 1918 may include biometric components 1930, motion components 1934, environment components 1936, or position components 1938, as well as a wide array of other components. For example, the biometric components 1930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1934 may include acceleration sensor components (e.g., accelerometer), gravitation sensor components, rotation sensor components (e.g., gyroscope), and so forth. The environment components 1936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1918 may include communication components 1940 operable to couple the machine 1900 to a network 1932 or devices 1920 via a coupling 1924 and a coupling 1922 respectively. For example, the communication components 1940 may include a network interface component or other suitable device to interface with the network 1932. In further examples, the communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1920 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1940, such as location via Internet Protocol (IP) geo-location, location via Wi-Fi® signal triangulation, location via detecting an NFC beacon signal that may indicate a particular location, and so forth.

FIG. 20 is a data flow diagram of one exemplary method of training a model to provide for determining of one or more probabilities of one or more input types provided in response to presentation of particular content. FIG. 20 shows the historical database 600 discussed above. The historical database may include historical results of previous presentations of content. As discussed above. A model builder 2010 may read the historical database 600 to generate a model database 2020. The model database 2020 may include data describing relationships between input types received in response to presented content, and the content's characteristics, user characteristics, temporal characteristics, and channel characteristics of the presentation.

A classifier 2030 may then read the model data 2020 to determine a probability that a user will respond to particular content 2055. For example, in some aspects, the classifier 2030 may determine a probability that a user responds with input of a first type 2040. In some aspects, the classifier 2030 may determine a probability that a user responds with input of a second type 2050. In some aspects, the probability 2040 and/or probability 2050 may be determined for each of the first and second content in blocks 810 and 820 respectively, discussed above.

The classifier 2030 may base the determination of probabilities 2030 and/or 2040 based on characteristics of the potential presentation of content 2055. As discussed above, characteristics considered include characteristics of the content itself 2060, characteristics of the user to which the content will be presented 2070 (e.g. data available via user database 750), characteristics of a channel 2080 over which the content may be presented (e.g. channel 710), and/or temporal aspects of the content presentation 2090 (e.g. view time 708).

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT, INC., All Rights Reserved.

We claim:

1. A method of presenting content on an electronic display, comprising:
    establishing a first session for a first user based on first user authentication credentials;
    identifying a first candidate content and a second candidate content for presentation on an electronic display to the first user via the first session;
    estimating, for the first candidate content, a plurality of probabilities of different types of input responses that will be received from the first user when the first candidate content is presented to the first user, the plurality of probabilities comprising a first probability that the first candidate content will elicit a first type of the different types of input responses and a second probability that the first candidate content will elicit a second type of the different types of input responses, the plurality of probabilities being estimated based on a time of day, season and month during which the first candidate content will be presented to the first user;
    estimating a third probability that the second candidate content will elicit a given type of input response of the different types of input responses from the first user, the plurality of probabilities obtained from a classifier trained based on a historical database of user responses to a plurality of content, characteristics of users generating the responses, characteristics of the plurality of content, and characteristics of channels over which the content was presented;
    selecting, as selected content, either the first content or the second content based on the plurality of probabilities and the third probability, the selecting comprising:
        causing presentation of the plurality of probabilities of the different types of input responses to a first entity associated with the first candidate content;
        causing presentation of the third probability that the second candidate content will elicit the given type of input response to a second entity associated with the second candidate content;
        determining that the first entity has changed a maximum bid amount in response to the plurality of probabilities; and
        determining that the second entity failed to change a bid amount based on the third probability, wherein the selected content is selected based on the bid amounts associated with the first and second entities; and
    presenting the selected content on the electronic display.

2. The method of claim 1, further comprising determining a first factor associated with the first content and a second factor associated with the second content, and determining first and second weights based on the first factor and the second factor respectively.

3. The method of claim 2, wherein determining the first weight comprises multiplying the first factor and the first probability to obtain the first weight.

4. The method of claim 3, further comprising incrementing a total number of impressions for the selected content in the historical response database in response to presentation of the selected content.

5. The method of claim 3, wherein estimating the plurality of probabilities comprises determining a total number of impressions of the first candidate content and a number of responses to the first candidate content having the first type.

6. The method of claim 5, further comprising estimating the first probability by dividing the number of responses by the number of impressions.

7. The method of claim 5, further comprising filtering the total number of impressions and the number of responses to those impressions and responses for a user having an age within a predetermined range or having a predetermined gender.

8. The method of claim 1, further comprising:
    receiving input in response to the presentation of the selected content;
    categorizing the received input as either a first type of input or a second type of input; and
    updating a historical response database based on the categorization of the received input.

9. The method of claim 1, further comprising estimating whether a user viewing the first candidate content will provide input of the first or second type.

10. The method of claim 1, further comprising predicting by a prediction model how the first user will respond when the first candidate content and the second candidate content is presented to the first user.

11. The method of claim 10, further comprising predicting the plurality of probabilities of the different types of input responses that will be received from the first user when the first candidate content is presented to the first user and predicting the third probability that the second candidate content will elicit the given type of input response of the different types of input responses.

12. The method of claim 1, further comprising presenting a first sequence of content to the first user, wherein the selected content is presented within the first sequence of content, and wherein the second type of the different types of input responses comprises a swipe up gesture that causes a second sequence of content to be presented to the first user.

13. The method of claim 1, wherein the historical database comprises a first column that stores a time of day in which a given content item of the plurality of content was presented, a second column that stores a view time representing an amount of time the given content item was viewed, and a third column that identifies the given content item.

14. The method of claim 1, wherein the first candidate content facilitates a first type of user interaction, and wherein the second candidate content facilitates a second type of user interaction, the first type of user interaction comprising adding a friend relationship within a social network, the second type of user interaction comprising scheduling an autonomous vehicle to pick up the first user at a location indicated by a client device of the first user.

15. The method of claim 1, wherein the classifier is trained to generate the plurality of probabilities based on a plurality of input parameters comprising a life time distribution channel swipe rate for a given content, a distribution channel swipe rate for the given content, a swipe rate for a month by a given user, a lifetime distribution channel skip rate for the given content, a swipe count for a previous month for the given content, a total number of swipes for the given content, an amount of time the given user has viewed given content within a 30 day period, a distribution channel skip rate for the given content, a skip rate per month for the given user, a lifetime number of swipes for the given content, a number of skips the given user has performed in a preview month, a number of times the given content has been skipped by a plurality of users who viewed the given content, a number of times the given user has viewed given content in the 30 day period, a life time number of skips for the given content, and an indication of whether the given content is displayed over a particular channel and a time of day, day of week, or month in which the given content is displayed.

16. The method of claim 1, wherein the plurality of probabilities is computed in accordance with an expression defined as:

$$P_tC = \text{number of responses of type } t/\text{total presentations of } C;$$

where $P_t$ represents a probability that a response of type t will be provided for particular content C.

17. An apparatus for presenting content on an electronic display, comprising:
one or more electronic hardware processors;
an electronic hardware memory, operatively coupled to the electronic hardware processor, and storing instructions that configure the one or more hardware processors to perform operations comprising:
identifying a first candidate content and a second candidate content for presentation on an electronic display to a first user;
estimating, for the first candidate content, a plurality of probabilities of different types of input responses that will be received from the first user when the first candidate content is presented to the first user, the plurality of probabilities comprising a first probability that the first candidate content will elicit a first type of the different types of input responses and a second probability that the first candidate content will elicit a second type of the different types of input responses, the plurality of probabilities being estimated based on a time of day, season and month during which the first candidate content will be presented to the first user;
estimating a third probability that the second candidate content will elicit a given type of input response of the different types of input responses from the first user, the plurality of probabilities obtained from a classifier trained based on a historical database of user responses to a plurality of content, characteristics of users generating the responses, characteristics of the plurality of content, and characteristics of channels over which the content was presented;
selecting, as selected content, either the first content or the second content based on the plurality of probabilities and the third probability, the selecting comprising:
causing presentation of the plurality of probabilities of the different types of input responses to a first entity associated with the first candidate content;
causing presentation of the third probability that the second candidate content will elicit the given type of input response to a second entity associated with the second candidate content;
determining that the first entity has changed a maximum bid amount in response to the plurality of probabilities; and
determining that the second entity failed to change a bid amount based on the third probability, wherein the selected content is selected based on the bid amounts associated with the first and second entities; and
present the selected content on the electronic display.

18. The apparatus of claim 17, wherein the classifier is trained to generate the plurality of probabilities based on a plurality of input parameters comprising a life time distribution channel swipe rate for a given content, a distribution channel swipe rate for the given content, a swipe rate for a month by a given user, a lifetime distribution channel skip rate for the given content, a swipe count for a previous month for the given content, a total number of swipes for the given content, an amount of time the given user has viewed given content within a 30 day period, a distribution channel skip rate for the given content, a skip rate per month for the given user, a lifetime number of swipes for the given content, a number of skips the given user has performed in a preview month, a number of times the given content has been skipped by a plurality of users who viewed the given content, a number of times the given user has viewed given content in the 30 day period, a life time number of skips for the given content, and an indication of whether the given content is displayed over a particular channel and a time of day, day of week, or month in which the given content is displayed.

19. The apparatus of claim 17, wherein the electronic memory stores further instructions that configure the one or more processors to determine a first factor associated with the first content and a second factor associated with the second content, and determine first and second weights based on the first factor and the second factor respectively.

20. A non-transitory computer readable medium comprising instructions that when executed cause a hardware processor to perform operations comprising:
- identifying a first candidate content and a second candidate content for presentation on an electronic display to a first user;
- estimating, for the first candidate content, a plurality of probabilities of different types of input responses that will be received from the first user when the first candidate content is presented to the first user, the plurality of probabilities comprising a first probability that the first candidate content will elicit a first type of the different types of input responses and a second probability that the first candidate content will elicit a second type of the different types of input responses, the plurality of probabilities being estimated based on a time of day, season and month during which the first candidate content will be presented to the first user;
- estimating a third probability that the second candidate content will elicit a given type of input response of the different types of input responses from the first user, the plurality of probabilities obtained from a classifier trained based on a historical database of user responses to a plurality of content, characteristics of users generating the responses, characteristics of the plurality of content, and characteristics of channels over which the content was presented;
- selecting, as selected content, either the first content or the second content based on the plurality of probabilities and the third probability, the selecting comprising:
    - causing presentation of the plurality of probabilities of the different types of input responses to a first entity associated with the first candidate content;
    - causing presentation of the third probability that the second candidate content will elicit the given type of input response to a second entity associated with the second candidate content;
    - determining that the first entity has changed a maximum bid amount in response to the plurality of probabilities; and
    - determining that the second entity failed to change a bid amount based on the third probability, wherein the selected content is selected based on the bid amounts associated with the first and second entities; and
- present the selected content on the electronic display.

* * * * *